(12) United States Patent
Oh et al.

(10) Patent No.: US 12,235,480 B2
(45) Date of Patent: *Feb. 25, 2025

(54) OPTICAL DEVICE WITH ONE-WAY MIRROR

(71) Applicant: Magic Leap, Inc., Plantation, FL (US)

(72) Inventors: Chulwoo Oh, Sammamish, WA (US); Ravi Kumar Komanduri, Austin, TX (US); David Kleinman, Cedar Park, TX (US); Vaibhav Mathur, Weston, FL (US); David Manly, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,180

(22) Filed: Feb. 13, 2024

(65) Prior Publication Data
US 2024/0184031 A1 Jun. 6, 2024

Related U.S. Application Data

(63) Continuation of application No. 17/211,457, filed on Mar. 24, 2021, now Pat. No. 11,940,639.
(Continued)

(51) Int. Cl.
*G02B 5/30* (2006.01)
*F21V 8/00* (2006.01)
(Continued)

(52) U.S. Cl.
CPC .......... *G02B 5/305* (2013.01); *G02B 5/0808* (2013.01); *G02B 5/3058* (2013.01);
(Continued)

(58) Field of Classification Search
CPC .............. G02B 27/0101; G02B 27/017; G02B 2027/0118; G02B 2027/012;
(Continued)

(56) References Cited

U.S. PATENT DOCUMENTS

| 6,049,419 A | 4/2000 | Wheatley et al. |
| 6,577,360 B1 | 6/2003 | Akiyama et al. |

(Continued)

FOREIGN PATENT DOCUMENTS

| JP | 2009031439 A | 2/2009 |
| JP | 2016085427 A | 5/2016 |

(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.
(Continued)

*Primary Examiner* — Mariam Qureshi
(74) *Attorney, Agent, or Firm* — Tobias Property Law, PLLC

(57) ABSTRACT

In some implementations, an optical device includes a one-way mirror formed by a polarization selective mirror and an absorptive polarizer. The absorptive polarizer has a transmission axis aligned with the transmission axis of the reflective polarizer. The one-way mirror may be provided on the world side of a head-mounted display system. Advantageously, the one-way mirror may reflect light from the world, which provides privacy and may improve the cosmetics of the display. In some implementations, the one-way mirror may include one or more of a depolarizer and a pair of opposing waveplates to improve alignment tolerances and reduce reflections to a viewer. In some implementations, the one-way mirror may form a compact integrated structure with a dimmer for reducing light transmitted to the viewer from the world.

18 Claims, 21 Drawing Sheets

Related U.S. Application Data

(60) Provisional application No. 62/994,739, filed on Mar. 25, 2020.

(51) Int. Cl.
  *G02B 5/08* (2006.01)
  *G02B 27/01* (2006.01)
  *G02F 1/1335* (2006.01)

(52) U.S. Cl.
  CPC ......... *G02B 5/3083* (2013.01); *G02B 6/0076* (2013.01); *G02B 27/0172* (2013.01); *G02F 1/133528* (2013.01); *G02B 2207/101* (2013.01)

(58) Field of Classification Search
  CPC ...... G02B 2027/0121; G02B 2027/015; B60R 2300/205; G03B 21/604
  See application file for complete search history.

(56) References Cited

U.S. PATENT DOCUMENTS

| | | | |
|---|---|---|---|
| 6,850,221 | B1 | 2/2005 | Tickle |
| 10,691,198 | B1 | 6/2020 | Gollier et al. |
| 10,935,399 | B1* | 3/2021 | Provenzano ......... G02B 6/4216 |
| 11,940,639 | B2 | 3/2024 | Oh et al. |
| 2006/0028436 | A1 | 2/2006 | Armstrong |
| 2007/0081123 | A1 | 4/2007 | Lewis |
| 2008/0186576 | A1 | 8/2008 | Takada |
| 2009/0015902 | A1 | 1/2009 | Powers et al. |
| 2009/0027600 | A1 | 1/2009 | Hisatake |
| 2012/0127062 | A1 | 5/2012 | Bar-Zeev et al. |
| 2012/0140311 | A1 | 6/2012 | Powers et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt et al. |
| 2015/0016777 | A1 | 1/2015 | Abovitz et al. |
| 2015/0103306 | A1 | 4/2015 | Kaji et al. |
| 2015/0116658 | A1 | 4/2015 | Trapani et al. |
| 2015/0178939 | A1 | 6/2015 | Bradski et al. |
| 2015/0205126 | A1 | 7/2015 | Schowengerdt |
| 2015/0277164 | A1 | 10/2015 | Nagase et al. |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0100142 | A1 | 4/2016 | Shin et al. |
| 2016/0178964 | A1* | 6/2016 | Sakai ................ G02F 1/133536 345/592 |
| 2016/0259167 | A1 | 9/2016 | Takagi et al. |
| 2018/0164627 | A1 | 6/2018 | Oh |
| 2018/0234675 | A1 | 8/2018 | Cheng et al. |
| 2018/0239177 | A1 | 8/2018 | Oh |
| 2018/0356639 | A1 | 12/2018 | Schaefer et al. |
| 2019/0187474 | A1 | 6/2019 | Bhargava et al. |
| 2019/0271853 | A1 | 9/2019 | Sharp |
| 2019/0285890 | A1 | 9/2019 | Lam et al. |
| 2019/0285891 | A1 | 9/2019 | Lam et al. |
| 2019/0331947 | A1 | 10/2019 | Hagiwara et al. |
| 2020/0089025 | A1 | 3/2020 | Li |
| 2021/0072533 | A1 | 3/2021 | Hudman et al. |
| 2021/0302636 | A1 | 9/2021 | Oh et al. |
| 2022/0057632 | A1 | 2/2022 | Yun et al. |

FOREIGN PATENT DOCUMENTS

| | | | |
|---|---|---|---|
| WO | 2020116008 | A1 | 6/2020 |
| WO | 2021195283 | A1 | 9/2021 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/ azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/raskar/book/BimberRaskarAugmentedRealityBook.pdf.

International Preliminary Report on Patentability for PCT Application No. PCT/US2021/023987, dated Sep. 22, 2022.

International Search Report and Written Opinion for PCT Application No. PCT/US2021/023987, dated Aug. 24, 2021.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).

EP21775152.8 Extended European Search Report dated Apr. 9, 2024.

* cited by examiner

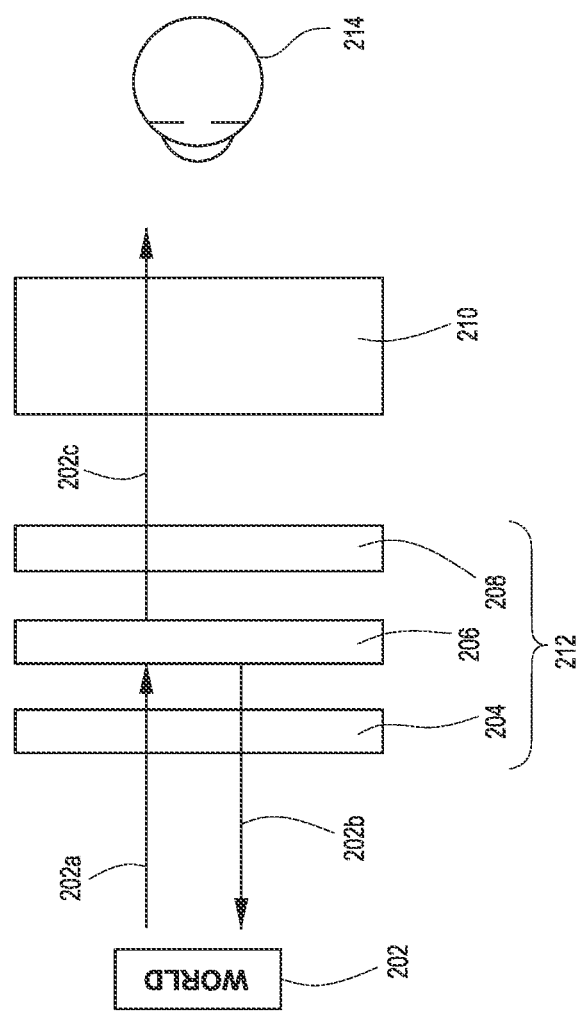

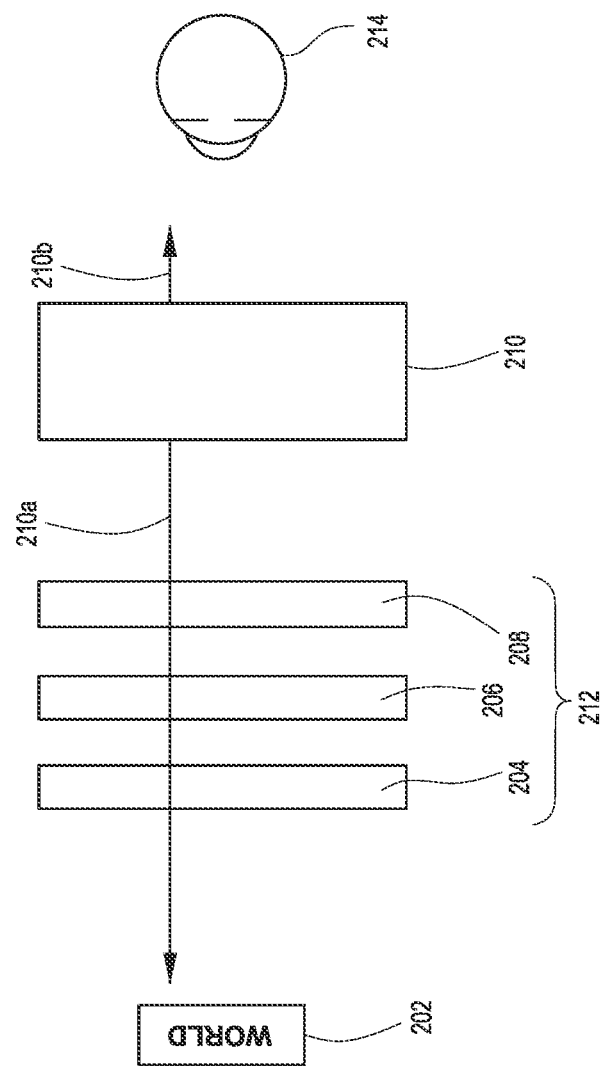

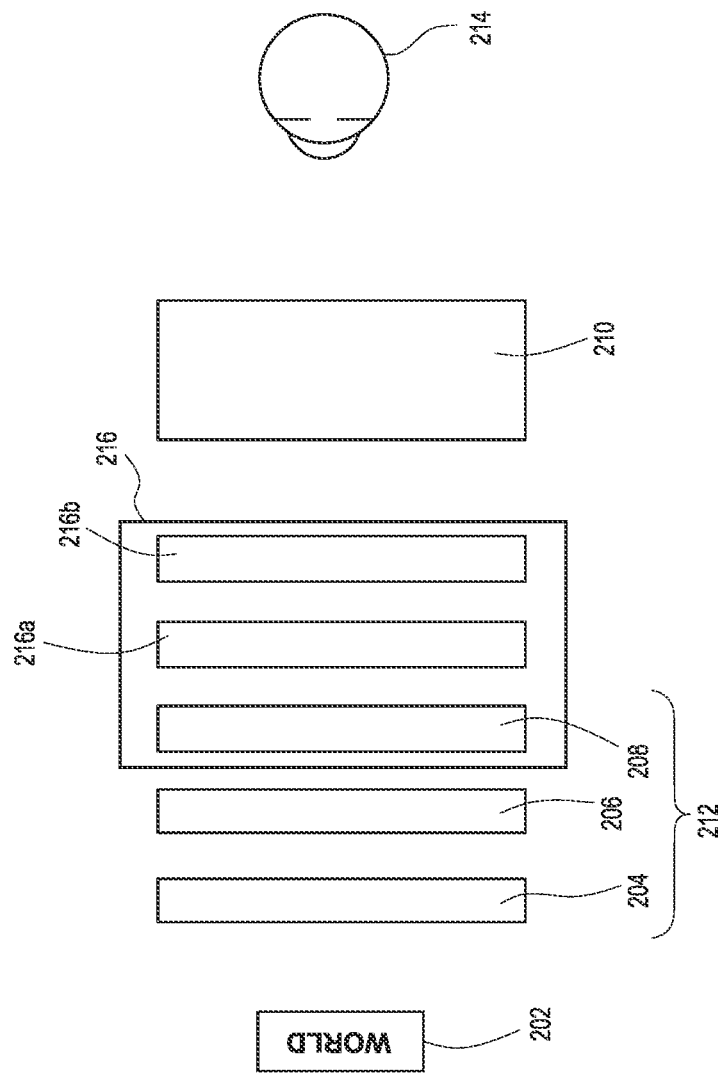

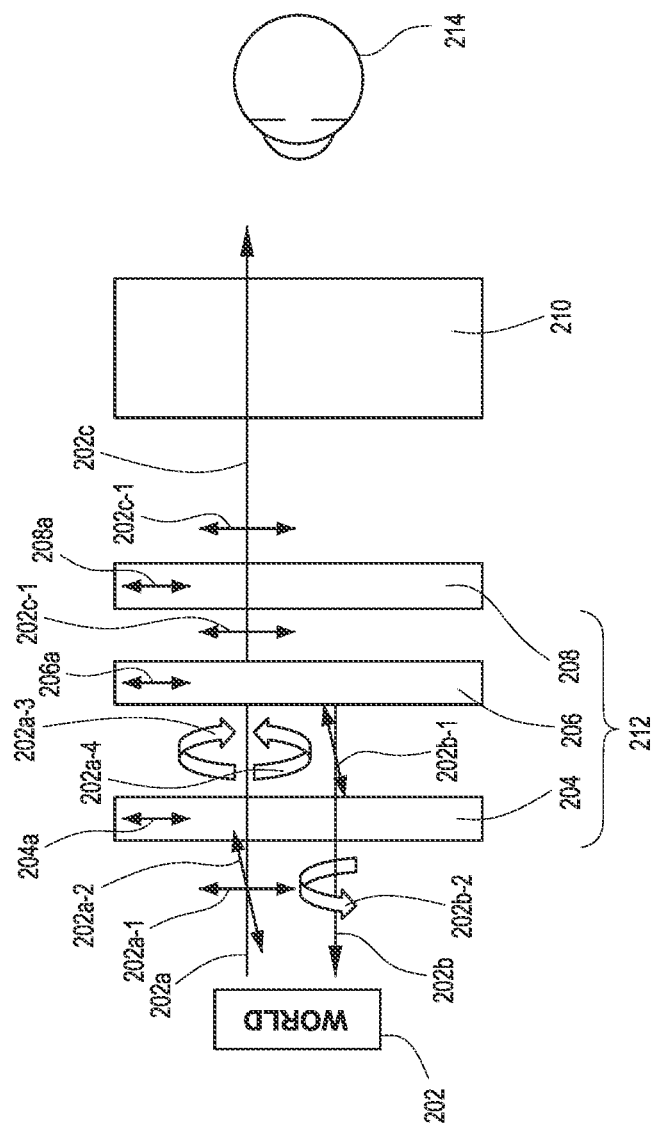

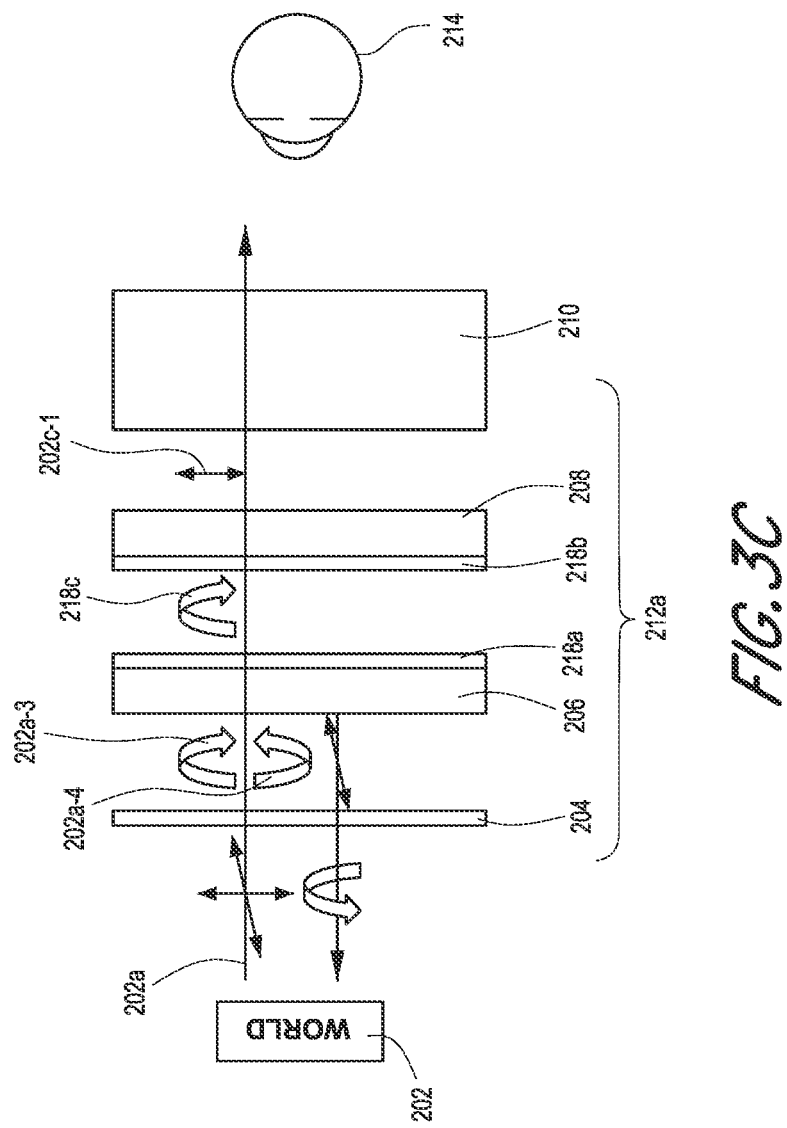

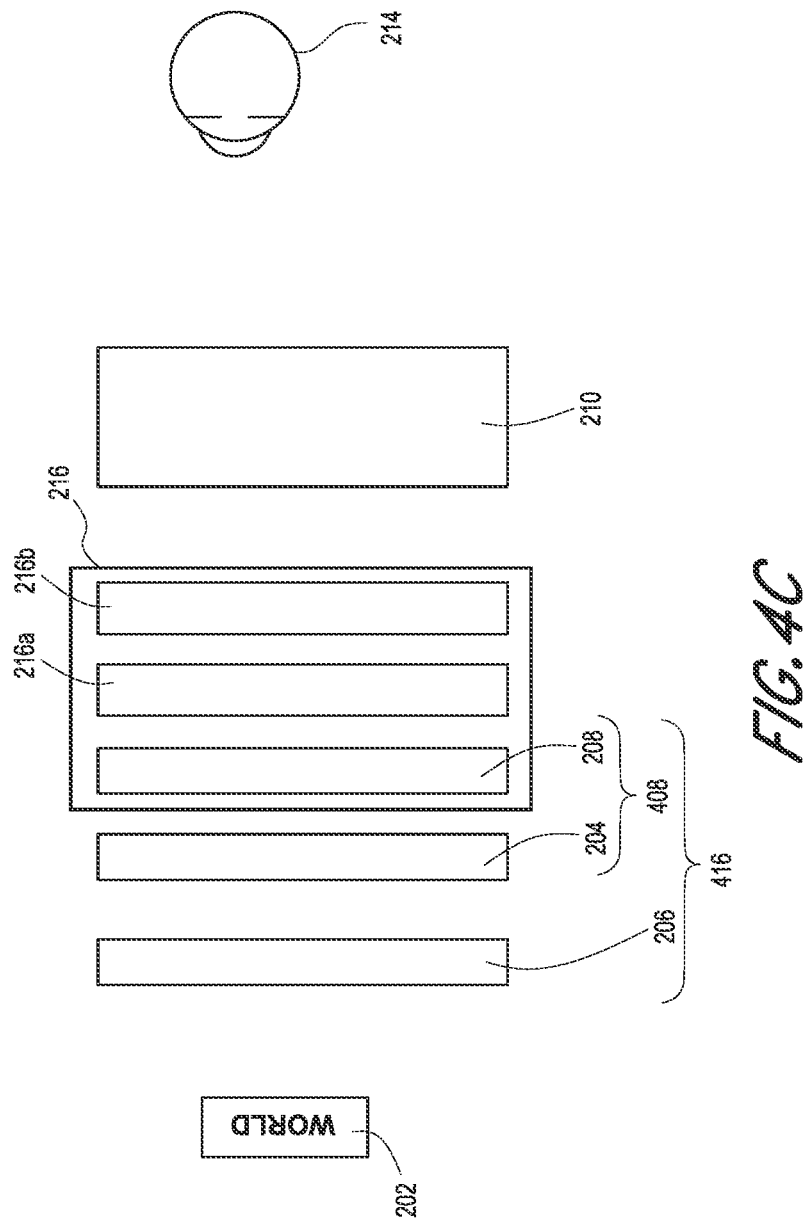

OPTICAL DEVICE WITH ONE-WAY MIRROR

PRIORITY CLAIM

This application is a continuation of U.S. application Ser. No. 17/211,457, filed Mar. 24, 2021, which claims priority to U.S. Provisional App. No. 62/994,739, filed Mar. 25, 2020. The entire contents of the above-listed applications are hereby incorporated by reference for all purposes.

INCORPORATION BY REFERENCE

This application incorporates by reference the entireties of each of the following: U.S. Pat. Pub. No. 2018/0234675, entitled "Method and System for Display Device with Integrated Polarizer", published Aug. 16, 2018; U.S. Pat. Pub. No. 2019/0187474A1, entitled "Eyepieces for Augmented Reality Display System", published Jun. 20, 2019; and U.S. Pat. Pub. No. 2018/0164627, entitled "Diffractive Devices Based on Cholesteric Liquid Crystal", published Jun. 14, 2018.

BACKGROUND

Field

This disclosure relates to optical devices including one-way mirrors, such as augmented reality display devices having one-way mirrors.

Description of the Related Art

Modern computing and display technologies have facilitated the development of systems for so called "augmented reality" experiences, in which digitally reproduced images or portions thereof are presented to a user in a manner wherein they seem to be, or may be perceived as, real. An augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1A, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by, which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address, among other things, various challenges related to AR technology.

SUMMARY

In some implementations, an optical device comprises a one-way mirror. The one-way mirror comprises a depolarizer; a polarization selective mirror oriented to receive light from the depolarizer and having a transmission axis; and an absorptive polarizer oriented to receive light from the polarization selective mirror and having a transmission axis aligned with the transmission axes of the polarization selective mirror. The polarization selective mirror is disposed between the depolarizer and the absorptive polarizer.

In some other implementations, an optical device comprises a one-way mirror. The one-way mirror comprises a cholesteric liquid crystal reflective polarizer; and a circular polarizer configured to receive light transmitted through the cholesteric liquid crystal reflective polarizer.

In yet other implementations, an optical device comprises a one-way mirrored dimmer. The one-way mirrored dimmer comprises a polarization selective mirror having a transmission axis; an absorptive polarizer rearward of the polarization selective mirror and having a transmission axis aligned with the transmission axis of the polarization selective mirror; an array of switchable liquid crystal elements rearward of the absorptive polarizer; and a polarizer rearward of the array of switchable liquid crystal elements and having a transmission axis aligned with the transmission axis of the absorptive polarizer.

In some other implementations, an optical device comprises a polarization selective mirror having a transmission axis; an absorptive polarizer having a transmission axis aligned with a transmission axis of the polarization selective mirror; and one or more retarders between the polarization selective mirror and the absorptive polarizer.

Additional examples of some implementations are provided below.

Implementation 1. An optical device comprising:
    a one-way mirror comprising:
        a depolarizer;
        a polarization selective mirror oriented to receive light from the depolarizer and having a transmission axis; and
        an absorptive polarizer oriented to receive light from the polarization selective mirror and having a transmission axis aligned with the transmission axes of the polarization selective mirror,
        wherein the polarization selective mirror is disposed between the depolarizer and the absorptive polarizer.

Implementation 2. The optical device of Implementation 1, wherein the depolarizer comprises a quarter waveplate.

Implementation 3. The optical device of Implementation 2, wherein the quarter waveplate comprises an achromatic quarter waveplate.

Implementation 4. The optical device of Implementation 1, wherein the depolarizer comprises a super retarder.

Implementation 5. The optical device of Implementation 1, wherein the depolarizer is configured to output circularly polarized light from received polarized light.

Implementation 6. The optical device of Implementation 1, wherein the polarization selective mirror comprises a reflective polarizer.

Implementation 7. The optical device of Implementation 1, wherein the polarization selective mirror directly contacts the absorptive polarizer.

Implementation 8. The optical device of Implementation 1, wherein the polarization selective mirror and the absorptive polarizer are spaced apart.

Implementation 9. The optical device of Implementation 8, further comprising one or more retarders between the polarization selective mirror and the absorptive polarizer.

Implementation 10. The optical device of Implementation 9, wherein one or more retarders comprises two spaced-apart quarter wave plates.

Implementation 11. The optical device of Implementation 1, wherein the absorptive polarizer absorbs light having an electric field vector perpendicular to the transmission axis of the absorptive polarizer.

Implementation 12. The optical device of Implementation 1, wherein the reflective polarizer reflects light having an electric field vector perpendicular to the transmission axis of the absorptive polarizer.

Implementation 13. The optical device of Implementation 1, wherein the reflective polarizer comprises a wire-grid polarizer.

Implementation 14. The optical device of Implementation 13, wherein the wire-grid polarizer comprises a nano-scale wire pattern with repeating parallel wires.

Implementation 15. The optical device of Implementation 14, wherein the wires of the wire pattern are each elongated parallel to the transmission axis of the polarization selective mirror.

Implementation 16. The optical device of Implementation 1, wherein the reflective polarizer comprises a multi-layer polarizer.

Implementation 17. The optical device of Implementation 16, wherein the multi-layer polarizer is configured to reflect incident light of a pre-determined wavelength.

Implementation 18. The optical device of Implementation 16, wherein the multi-layer polarizer comprises a plurality of polymer films.

Implementation 19. The optical device of Implementation 16, wherein the multi-layer polarizer reflects 50% of incident light with an electric field vector perpendicular to the transmission axis of the multi-layer polarizer.

Implementation 20. The optical device of Implementation 16, wherein the multi-layer polarizer reflects 30%-40% of incident light with an electric field vector perpendicular to the transmission axis of the multi-layer polarizer.

Implementation 21. The optical device of Implementation 1, wherein the absorptive polarizer is configured to absorb linearly polarized light.

Implementation 22. The optical device of Implementation 1, further comprising:
an actively variable dimmer comprising:
an array of liquid crystal elements; and a polarizer,
wherein the array of liquid crystal elements is between the polarizer and the absorptive polarizer of the one-way mirror.

Implementation 23. The optical device of Implementation 1, wherein the optical device is a head-mounted display system, wherein the display system comprises:
a head-mounted display,
wherein the one-way mirror is disposed on the head-mounted display and opposite a user side of the display.

Implementation 24. The optical device of Implementation 23, wherein the display comprises an eyepiece comprising a waveguide stack, the waveguide stack comprising:
a plurality of waveguides each configured to output light to a viewer.

Implementation 25. The optical device of Implementation 24, wherein each waveguide of the plurality of waveguides is configured to output light with a different amount of wavefront divergence than one or more other waveguides of the plurality of waveguides,
wherein different amounts of wavefront divergence correspond to different depth planes.

Implementation 26. The optical device of Implementation 24, wherein each waveguide comprises diffractive in-coupling optical elements and diffractive out-coupling optical elements.

Implementation 27. An optical device comprising: a one-way mirror comprising:
a cholesteric liquid crystal reflective polarizer; and
a circular polarizer configured to receive light transmitted through the cholesteric liquid crystal reflective polarizer.

Implementation 28. The optical device of Implementation 27, wherein the circular polarizer comprises a quarter waveplate and an absorptive polarizer.

Implementation 29. The optical device of Implementation 28, wherein the absorptive polarizer comprises a linear polarizer.

Implementation 30. The optical device of Implementation 28, wherein the quarter waveplate retards light in an opposite direction than the light transmitted by the cholesteric liquid crystal reflective polarizer.

Implementation 31. The optical device of Implementation 28, wherein the quarter waveplate is an achromatic quarter waveplate.

Implementation 32. The optical device of Implementation 27, wherein the cholesteric liquid crystal reflective polarizer transmits a first circularly polarized light and reflects a second circularly polarized light with an opposite orientation from the first circularly polarized light.

Implementation 33. The optical device of Implementation 28, wherein the quarter waveplate is configured to retard light such that circularly polarized light transmitted through the cholesteric liquid crystal reflective polarizer is transformed into linearly polarized light.

Implementation 34. The optical device of Implementation 28, wherein the absorptive polarizer has a transmission axis parallel to an electric field vector of the linearly polarized light.

Implementation 35. The optical device of Implementation 27, wherein the optical device is a head-mounted display system, wherein the display system comprises:
a head-mounted display,
wherein the one-way mirror is disposed on the head-mounted display and opposite a user side of the head-mounted display.

Implementation 36. The optical device of Implementation 35, wherein the head-mounted display comprises an eyepiece comprising a waveguide stack, the waveguide stack comprising:
a plurality of waveguides each configured to output light to a viewer.

Implementation 37. The optical device of Implementation 36, wherein each waveguide is configured to output light with a different amount of wavefront divergence than one or more other waveguides,
wherein different amounts of wavefront divergence correspond to different depth planes.

Implementation 38. The optical device of Implementation 27, further comprising:
an actively variable dimmer comprising: a polarizer; and
an array of liquid crystal elements,
wherein the array of liquid crystal elements is between the polarizer and the absorptive polarizer of the one-way mirror.

Implementation 39. The optical device of Implementation 38, wherein liquid crystal elements of the array of liquid crystal elements is configured to switch from a transmission mode to an absorption mode.

Implementation 40. An optical device comprising: a one-way mirrored dimmer comprising:
- a polarization selective mirror having a transmission axis;
- an absorptive polarizer rearward of the polarization selective mirror and having a transmission axis aligned with the transmission axis of the polarization selective mirror;
- an array of switchable liquid crystal elements rearward of the absorptive polarizer; and
- a polarizer rearward of the array of switchable liquid crystal elements and having a transmission axis aligned with the transmission axis of the absorptive polarizer.

Implementation 41. The optical device of Implementation 40, further comprising first and second quarter wave plates between the polarization selective mirror and the absorptive polarizer.

Implementation 42. The optical device of Implementation 41, wherein the first and second achromatic quarter wave plates are separated by an air gap of more than 1 mm.

Implementation 43. The optical device of Implementation 40, wherein the polarization selective mirror is a wire-grid polarizer.

Implementation 44. The optical device of Implementation 40, wherein the polarization selective mirror is a multi-layer reflective polarizer.

Implementation 45. The optical device of Implementation 40, wherein the optical device is a head-mounted display system, wherein the display system comprises:
- a head-mounted display,
  - wherein the one-way mirrored dimmer is disposed on the head-mounted display and opposite a user side of the head-mounted display.

Implementation 46. The optical device of Implementation 45, wherein the head-mounted display comprises an eyepiece comprising a waveguide stack, the waveguide stack comprising:
- a plurality of waveguides each configured to output light to a viewer.

Implementation 47. The optical device of Implementation 46, wherein each waveguide is configured to output light with a different amount of wavefront divergence than one or more other waveguides,
  - wherein different amounts of wavefront divergence correspond to different depth planes.

Implementation 48. An optical device comprising:
- a polarization selective mirror having a transmission axis;
- an absorptive polarizer having a transmission axis aligned with a transmission axis of the polarization selective mirror; and
- one or more retarders between the polarization selective mirror and the absorptive polarizer.

Implementation 49. The optical device of Implementation 48, wherein the one or more retarders comprises two spaced-apart quarter waveplates.

Implementation 50. The optical device of Implementation 49, wherein the two quarter waveplates each comprise an achromatic quarter waveplate.

Implementation 51. The optical device of Implementation 49, wherein the two quarter waveplates are spaced apart by an air gap of 1 mm or more.

Implementation 52. The optical device of Implementation 48, wherein the optical device is a head-mounted display system, wherein the display system comprises:
- a head-mounted display,
  - wherein the one-way mirrored dimmer is disposed on the head-mounted display and opposite a user side of the head-mounted display.

Implementation 53. The optical device of Implementation 52, wherein the head-mounted display comprises an eyepiece comprising a waveguide stack, the waveguide stack comprising:
- a plurality of waveguides each configured to output light to a viewer.

Implementation 54. The optical device of Implementation 53, wherein each waveguide is configured to output light with a different amount of wavefront divergence than one or more other waveguides,
  - wherein different amounts of wavefront divergence correspond to different depth planes.

BRIEF DESCRIPTION OF THE DRAWINGS

FIGS. 2A and 2B are examples of schematic side views of an optical device having a one-way mirror and a display.

FIG. 2C is an example of a schematic side view of an optical device similar to the optical device of FIGS. 2A and 2B, with the one-way mirror forming part of an integrated dimmer.

FIGS. 3A and 3B are examples of schematic side views of the one-way mirror and display of FIGS. 2A and 2B, showing details of the propagation of light through the optical device of each of FIGS. 2A and 2B, respectively.

FIGS. 3C and 3D are examples of schematic side views of an optical device having a one-way mirror with optical retarders for providing circularly polarized light.

FIG. 4C is an example of a schematic side view of an optical device similar to the optical device of FIGS. 4A and 4B, with the one-way mirror having an integrated dimmer.

DETAILED DESCRIPTION

Figure 1A:
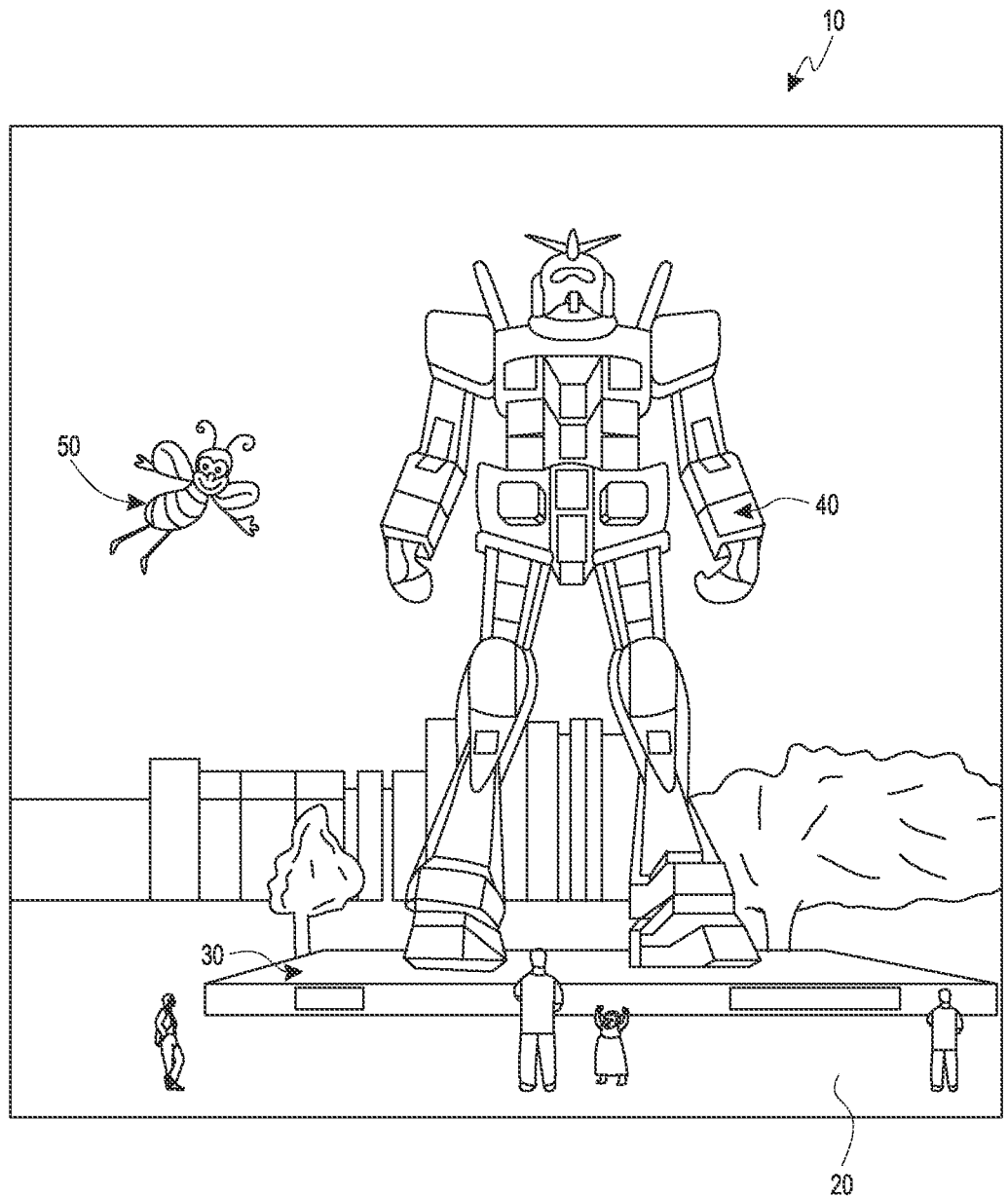
FIG. 1A illustrates a user's view of augmented reality (AR) through an AR device.

Augmented reality (AR) systems may display virtual content to a user, or viewer. This content may be displayed on a head-mounted display, for example, as part of eyewear, that projects image information to the user's eyes. In addition, where the system is an AR system, the display may also transmit light from a surrounding environment to the user's eyes, to allow a view of the surrounding environment. As used herein, it will be appreciated that a "head-mounted" or "head mountable" display is a display that may be mounted on the head of the user or viewer, and may be a near-eye display.

When using AR devices, the user is able to see both the surrounding, or ambient, environment and also virtual content presented by a display. The display may output image light rearwards towards the user's eye to display the virtual content. In addition, some of this image light may be ejected forwards, towards the surrounding environment. For example, image light may be ejected from the display to the user's eyes using diffractive optical elements, which function symmetrically to also eject image light in an opposite direction, towards the surrounding environment. Thus, an individual in the surrounding environment may undesirably be able to see the displayed content, or may see outputted light that negatively impacts the aesthetic appeal of the display device. Maintaining the privacy of this displayed content, however, is particularly difficult in AR devices because the AR devices are designed to be transmissive, to let in light from the surrounding environment. Thus, it is not an option to merely block all image light from exiting out into the surrounding environment.

In some implementations, privacy, aesthetics, and mechanical stability and strength may be improved using a one-way mirror. The one-way mirror is partially reflective, such that light from the surrounding environment is partially reflected back towards the world and partially transmitted to the user. The light reflected towards the surrounding environment may be used to obscure the content of the image light outputted from the display towards the surrounding environment, while the transmission of light through the one-way mirror allows the user to see the surrounding environment. Thus, privacy and aesthetics may be improved. In addition, by providing an additional structure in front of a display, the mechanical strength of the assembly may be increased, while the one-way mirror may also provide protection for the display.

In some implementations, the one-way mirror is formed using a polarization selective mirror forward of a polarizer. As used herein, "forward" refers to the relative positions of two structures, with the forward side of the structure being the side in the direction that the one-way mirror is configured to reflect light (e.g., out towards the surrounding environment), and the "rearward" side of the structure being the side in a direction that the one-way mirror is configured to transmit light (e.g., towards the user). For example, for a head-mounted display, with a one-way mirror configured to reflect light back into the world, a polarization selective mirror forward of a polarizer is disposed on the world side of the polarizer, with the polarizer being rearward of the polarization selective mirror (or on the user side of the polarization selective mirror). The polarization selective mirror reflects light of one polarization, while transmitting light of another polarization, e.g., to a user's eye. The one-way mirror may be provided forward of the display. However, image light may also be ejected from the display to the polarization-selective mirror, which may undesirably reflect the light back to the user's eye and decrease perceived image quality. Advantageously, the polarizer may be utilized to change the polarization of light ejected from the display, such that the light is transmitted through the polarization-selective mirror.

It will be appreciated, however, that one-way mirrors may face various challenges, which may advantageously be addressed by certain implementations disclosed herein. For example, light from the ambient environment may be polarized (e.g., light from other display devices, such as smart phones, watches, televisions, etc.) and, depending on the orientation of the one-mirror relative to the source of that light, the polarized ambient light may not be transmitted through the one-way mirror. As a result, the user may not be able to see parts of the ambient environment that outputs or is made visible by directing polarized light to a viewer. In some implementations, a depolarizer may be provided as part of the one-way mirror, forward of the polarization-selective mirror. In some implementations, the depolarizer randomizes the polarization of incoming light, e.g., converting light of one polarization into light of two different polarizations, one of which is reflected by the polarization-selective mirror and one of which is transmitted through the polarization-selective mirror and the polarizer, thereby allowing a user to receive the transmitted polarized light and to perceive content provided by that polarized light. It will be appreciated that the depolarizer may be understood to change the polarization of light incident on and transmitted through it, so that any changes of the polarization of the incident light are not perceivable by human vision, even when polarizing elements such as polarizers are applied to filter the transmitted light.

In some implementations, the presence of the polarizer rearward of the polarization selective mirror allows for the formation of compact integrated structures with additional optical functionality. For example, the polarizer may be used in conjunction with an actively variable dimmer formed using a rearward array of liquid crystal elements and an additional rearward polarizer. The variable dimmer allows the transmission of light from the ambient environment to be modulated, e.g., to facilitate the presentation of virtual content by the display device by blocking ambient light that may overlap spatially with the virtual content.

It will be appreciated that the polarization-selective mirror and the polarizer of the one-way mirror are aligned such that the light (e.g., image light from the display) converted by the polarizer is transmitted through the one-way mirror towards the ambient environment, and vice versa. Proper alignment of the polarization-selective mirror and the polarizer, however, may be challenging, e.g., in implementations where the polarization selective mirror is spaced apart from the polarizer by a gap, e.g., an air gap of 1 mm or more. An alignment error between the transmission axes of the polarization-selective mirror and the polarizer may lead to un-desired reflection of the display light from the polarization-selective mirror back to the user, which may degrade visual qualities of displays (e.g., cause duplicated images of display contents with perceivable mismatches between images). In such cases, because the polarization selective mirror and the polarizer are not directly attached to one another, misalignments may occur during manufacture and/or may develop over time in the course of using the device. In some implementations, the alignment tolerances between the polarization-selective mirror and the polarizer may be increased using optical retarders attached to the polarization-selective mirror and the polarizer, respectively. The optical retarders may be configured to convert linear polarization to circular polarization, and may be quarter-wave plates. In some implementations, these retarders also may be designed to operate over visible wavelength spectrum. A first retarder converts light passing through the polarization-selective mirror into circularly polarized light, which propagates to a second retarder that converts the circularly polarized light into linearly polarized light for propagation through the polarizer. A similar conversion of linearly polarized light to circularly applied light and back to linearly polarized light occurs for light traveling in the opposite direction, from the display out towards the ambient environment. Preferably, the first retarder is attached or laminated to the polarization selective mirror and the second retarder is attached or laminated to the polarizer rearward of the polarization selective mirror. Since the light propagating between the first and second retarders is circularly polarized, the one-way mirror is relatively insensitive to the relative orientations of the first and second retarders, thereby increasing alignment tolerances. In addition, as discussed herein, the second retarder may advantageously reduce the reflection of image light back to the user due to Fresnel reflections off surfaces forward of the second retarder.

In some implementations, the polarization selective mirror may be a cholesteric liquid crystal reflective polarizer. Such a polarization selective mirror advantageously provides for a compact one-way mirror, with large alignment tolerances. For example, a cholesteric liquid crystal reflective polarizer may convert linearly polarized light from the ambient environment into circularly polarized light, thereby providing large alignment tolerances with rearward polarizers, as discussed above. This may be achieved without need of first and second retarders, as described above, which may thereby allow the formation of a highly compact one-way mirror. In some other implementations, the polarization selective mirror may be a wire-grid polarizer, which may comprise an array of nano-wires of metallic materials such as aluminum, or a multi-layer polarizer, which may comprise alternating layers of anisotropic films such as stretched polymer films.

It will be appreciated that implementations disclosed herein may provide one or more advantages, as discussed herein. For example, the one-way mirror may increase the aesthetic appeal of the display system by providing an appearance more closely resembling eyewear, such as sunglasses. In addition, by providing a separate structure forward of a display, the one-way mirror may increase the mechanical strength of the display and also shields and protects parts of the display providing image content to the user. In addition, the one-way mirror may hide complex functional components in the display, thereby further increasing the aesthetic appeal of the display system. Further, as discussed above, privacy may be increased by reducing the visibility of image light outputted towards the ambient environment.

Reference will now be made to the drawings, in which like reference numerals refer to like parts throughout.

FIG. 1A is a perspective view of an example wearable augmented reality (AR) display system 60 including a display assembly 102 for presenting image light to a user's eye. The display assembly 102 may include a pair of displays 104, one for each eye of the user. The displays 104 may be optical structures that output image light to provide virtual content to a user's eyes. In some other implementations, the displays 104 may simply be different sections of a contiguous light output structure (e.g., a single panel having two different sections).

In some implementations, the displays 104 may be optical combiners that are at least partially transmissive to light coming in from the outside world and also configured to output image light (light having image information for forming virtual content) towards a user's eye. For example, the optical combiners may be eyepieces that relay the image light to the user's eyes. The displays 104 may correspond to the waveguide 270 or waveguide stacks 260 or 660, discussed further herein regarding FIGS. 5-9D. As discussed further herein, the display assembly 102 may include a one-way mirror configured to reflect ambient light while still allowing the user to see the world and also allowing light from the display to be transmitted through the one-way mirror and away from the user.

Figure 3B:
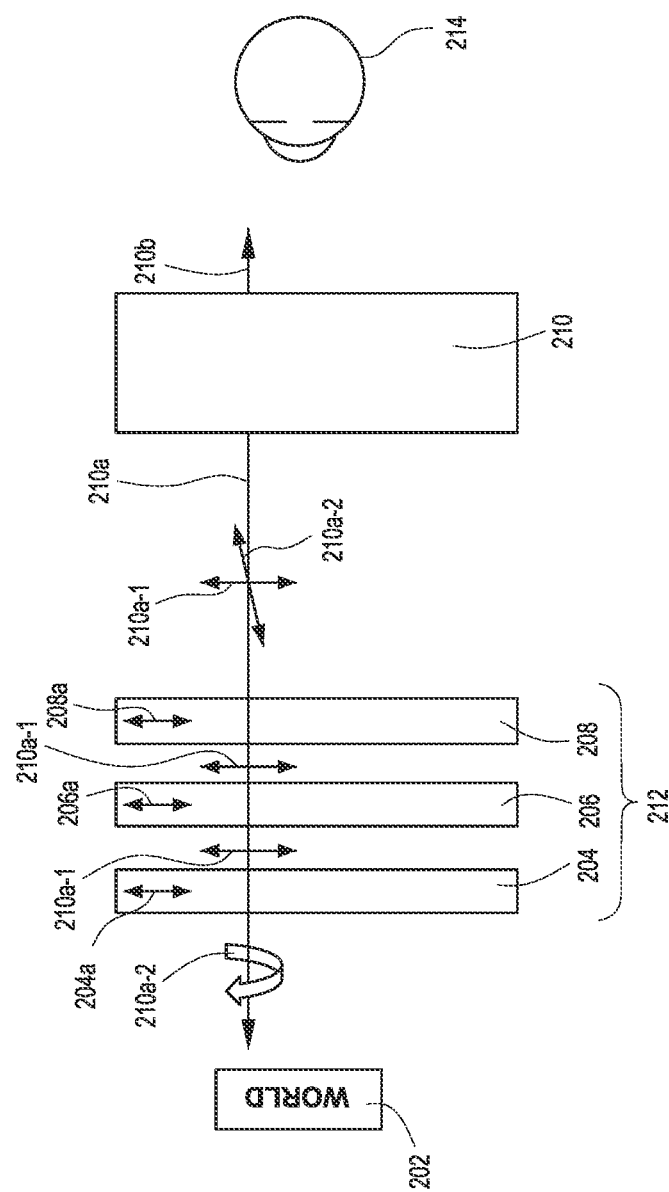

FIGS. 2A and 2B are examples of schematic side views of an optical device having a one-way mirror 212 and a display 210. FIG. 2A illustrates an example of the interaction between light from the surrounding environment ("world light") and the one-way mirror 212, with some world light reflected back to the surrounding environment and some world light transmitted through the one-way mirror 212 to an eye 214. FIG. 2B illustrates an example of the interaction of light, outputted by the display 210: some light propagates towards an eye 214 of the user, and some light propagates through the one-way mirror 212 to the surrounding environment. FIGS. 3A and 3B are similar to FIGS. 2A and 2B, and further illustrate details regarding the polarization of light propagating through the structures of FIGS. 2A and 2B.

Figure 1B:
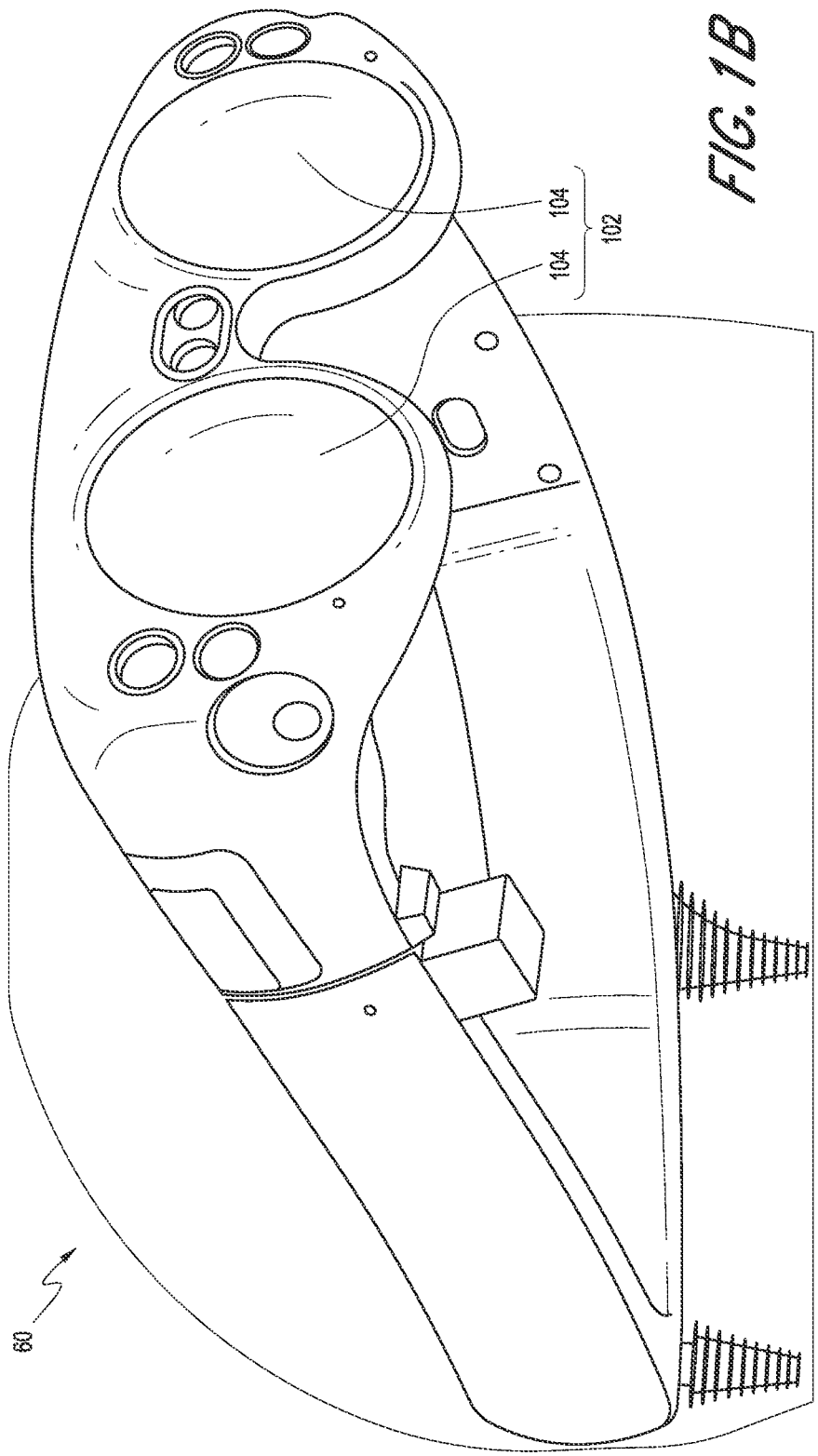
FIG. 1B is a perspective view of an example wearable augmented reality (AR) display system.

With continued reference to FIG. 2A, it will be appreciated that the display 210 may correspond to one of the displays 104 of FIG. 1B. The one-way mirror 212 may be disposed forward of the display 210. The one-way mirror 212 includes a polarization selective mirror 206 and an absorptive polarizer 208. The one-way mirror 212 may further include a depolarizer 204 forward of the polarization selective mirror 206, such that the polarization selective mirror 206 is disposed between the depolarizer 204 and the absorptive polarizer 208. In some implementations, the polarization selective mirror 206 may include a reflective polarizer, such as a wire-grid polarizer, a multi-layer polarizer, or a cholesteric liquid crystal reflective polarizer. In some implementations, the absorptive polarizer 208 may include a crystal-based polarizer, a Polaroid-based polarizing filter, or a nano particle-based polarizer. The absorptive polarizer 208 may be configured to absorb light having a polarization not aligned with the transmission axis of the absorptive polarizer 208.

As noted herein, FIG. 2A illustrates the interaction of light from the outside world 202 (the surrounding environment) with the one-way mirror 212. World light 202a propagates through the depolarizer 204 to the polarization selective mirror 206, at which a portion 202b of the world light 202a is reflected back to the surrounding environment 202. Another portion 202c of the world light 202a propagates through the absorptive polarizer 208 and on through the display 210 to the user's eyes 214, thereby allowing the user to see the surrounding environment.

FIG. 3A provides additional details regarding optical properties of various parts of the one-way mirror 212 to facilitate the optical functionality of that mirror. It will be appreciated that each of the depolarizer 204, polarization selective mirror 206, and absorptive polarizer 208 may be configured to preferentially transmit light of one polarization and may block the transmission of light of another polarization. Thus, the depolarizer 204, polarization selective mirror 206, and absorptive polarizer 208 may each be understood to be optical structures having a transmission axis, such that light of a particular polarization and orientation aligned with the transmission axis, is transmitted or propagates through that structure, while light of a different polarization may not be transmitted through. For example, in some implementations, light having an electric field vector parallel with the transmission axis may be transmitted, while light having an electric field vector perpendicular to the transmission axis may not be transmitted. It will be appreciated that, in some implementations, such as where the polarization selective mirror 206 is a wire-grid polarizer, the transmission axis may be perpendicular to the elongate direction of the "wire" forming a wire-grid polarizer. A similar relationship may hold for other polarizers formed of substantially linear rows of material. Preferably, the transmission axis 206a of the polarization selective mirror 206 is aligned with, or substantially parallel to, the transmission axis 208a of the absorptive polarizer 208.

As illustrated, world light 202a from the surrounding environment 202 may propagate towards the polarization selective mirror 206. As shown in FIG. 3A, the world light 202a may include light of a linear polarization 202a-1 which has an electric field vector parallel to the transmission axis 206a of the polarization selective mirror 206 and the transmission axis 208a of the absorptive polarizer 208. The world light 202a may also have light of a linear polarization 202a-2 which has an electric field vector oriented perpendicular to the transmission axis of the polarization selective mirror 206 and the absorptive polarizer 208. When the world light 202a reaches the polarization selective mirror 206, the light with a perpendicular electric field vector 202b-1 is reflected as reflected light 202b by the polarization selective mirror 206 whereas the light with parallel electric field vector 202c-1 is transmitted as transmitted light 202c through the polarization selective mirror 206. Further, the light with electric field vector parallel 202c-1 is also transmitted through the absorptive polarizer 208 because the transmission axes 206a, 208a of the polarization selective mirror 206 and the absorptive polarizer 208, respectively, are aligned.

With continued reference to FIG. 3A, as noted above, the world light 202a may include light of different polarizations, some of which is reflected and some of which is transmitted through the one-way mirror 212. The world light 202a may also include polarized light having a single polarization, such as light from external displays (e.g., computer monitors, phone displays, watch displays, etc.). It will be appreciated that if this light strikes the polarization-selective mirror 206 and is not aligned with the transmission axis 206a, all of this polarized light may be reflected. As result, the polarized light may not reach the eye 212 and undesirably the user may not be able to read the external display.

Advantageously, the depolarizer 204 may be provided to randomize the polarization of inbound world light 202a. In some implementations, the depolarizer 204 may have a transmission axis 204a aligned with the transmission axis 206a of the polarization selective mirror 206 and the transmission axis 208a of the absorptive polarizer 208a. In some implementations, transmission axis 204a of the depolarizer 204 may be understood to indicate that at least some of the light outputted by the depolarizer 204 is of a polarization which is aligned with the transmission axis of the polarization-selective mirror 206 so as to be transmitted through that polarization-selective mirror 206. In some implementations, 20-70%, 30-70% 30-60%, or 40-60% of the polarized world light 202a initially incident on the depolarizer 204 is transmitted through the one-way mirror 212 towards the eye 214.

In some implementations, the depolarizer 204 may be a quarter wave plate such as an achromatic quarter waveplate (AQWP). In some implementations, the depolarizer 204 may be a super retarder or one or more layers of material having high retardation values. In some implementations, the depolarizer 204 may be a retarder with random optical axis orientations. In some implementations, the depolarizer 204 may be configured to a portion of the polarized light to circularly polarized light. As illustrated in FIG. 3A, where the world light 202a is polarized (e.g. having light of one of orientations 202a-1, 202a-2), the depolarizer 204 may convert a portion of the polarized world light 202a into light that is right hand circularly polarized 202a-4 and/or light that is left hand circularly polarized 202a-3 before reaching the polarization selective mirror 206. Whether the light outputted by the depolarizer 24 is randomly, linearly, or circularly polarized, preferably a portion of the light outputted by the depolarizer 204 is of a polarization such that that portion of the light is transmitted through the polarization-selective mirror 206. Preferably, in some embodiments, 20-70%, 30-70% 30-60%, or 40-60% of the light outputted by the depolarizer 204 has a linear component aligned with the transmission axis of the polarization-selective mirror 206, so as to be transmitted through the polarization-selective mirror 206. In some implementations, the light 202b which is reflected off the polarization selective mirror 206 may have a linear polarization 202b-1, and the depolarizer 204 may convert this light 202b into circularly polarized light 202b-2.

With reference again to FIG. 2B, the transmission of light outputted from the display 210 is illustrated. Preferably, image light 210b is outputted from the display 210 into the user's eye 214. The display 210 may incidentally also output light 210a toward the surrounding environment 202.

With reference now to FIG. 3B, light 210a coming from the display 210 includes light with: polarization 210a-1 aligned with the transmission axes 206a, 208a of the polarization selective mirror 206 and the absorptive polarizer 208, respectively; and light with polarization oriented perpendicular 210a-2 to the transmission axes 206a, 208a. The light with polarization 210a-1 aligned with the transmission axis 208a of the absorptive polarizer 208 is transmitted through the absorptive polarizer 208 while the light with polarization 210a-2 oriented perpendicular to the transmission axis 208a of the absorptive polarizer 208 is absorbed by the absorptive polarizer 208. Further, this light 210a preferably transmits through the polarization selective mirror 206 with substantially no or only low levels of reflection, and thus is not reflected back towards the user's eye 214. It will be appreciated that light reflected back toward the user's eye 214 by the one-way mirror 212 may undesirably negatively impact the user's viewing experience of the image outputted by the display, since this reflected image light may be time delayed and/or suffer from aberrations as a result of being reflected.

As illustrated in FIG. 3B, the depolarizer 204 further converts image light 210a from the display 210 that has been polarized to have a specific polarization 210a-1 into a circular polarization 210a-2. Without converting the light into circularly polarized light, eyewear with linear polarizers (such as polarizing sunglasses) viewing the light 210a and 202b could, in certain orientations, filter out the reflected light 202b and transmit image light 210a, thereby allowing the image light to be visible to wearers of that eyewear. By converting the light 202a reflected by the polarization selective mirror 206 and the light 210a from the display 210 into circularly polarized light 202b-2, 210a-2, a viewer in the surrounding environment 202 of the light 202a, 210a having eyewear with linear polarizers may not have an electric field vector where the viewer would be able to see merely the light 210a from the display 210 and, thus, the depolarizer 204 further aids in providing privacy.

With continued reference FIGS. 3A and 3B, in some implementations, as noted herein, the polarization selective mirror 206 may be a wire-grid polarizer (WGP) configured to reflect linearly polarized light. As an example, the WGP may include a nano-scale wire pattern with repeating parallel wires. In some implementations, the wires of the wire pattern may each be elongated perpendicular to the transmission axis 206a of the polarization selective mirror 206.

In some implementations, the polarization selective mirror 206 may be a multi-layer polarizer (MLP). The multi-layer polarizer may be configured to reflect incident light of a pre-determined wavelength. For example, the pre-determined wavelength may include wavelengths corresponding to different colors. In some implementations, the multi-layer polarizer may include a plurality of polymer thin films that have been extruded and stretched along an axis, which may provide differences in refractive indices along the stretch axis and the transverse axis. Advantageously, the multi-layer polarizer may allow for customization of the color of the one-way mirror, thereby providing the ability to provide display systems of a variety of different colors, just as sunglasses may be provided in different tints. This may improve the cosmetic appeal of the display system. For example, the different colors may be provided by use of a multi-layer polarizer that reflects light of a predetermined wavelength (corresponding to a desired color). In addition, while reflecting light of certain wavelengths, the color point of world light reaching the user's eye 214 may not be affected as the transmitted light will be determined by the absorptive polarizer 208, which may be configured to alter the color point by preferentially transmitting some wavelengths of light. Further, it will be appreciated that multi-layer polarizers may have different reflectivity. The multi-layer polarizer may advantageously be configured to provide a tailored amount of privacy based on the amount of light reflected; for example, multi-layer polarizer's with higher reflectivity may be utilized for higher privacy and multi-layer polarizer's with lower reflectivity may be utilized when privacy requirements are lower.

With reference now to FIG. 2C, it will be appreciated that the absorptive polarizer 208 may advantageously be utilized to form other optical structures to provide additional optical functionality. For example, FIG. 2C illustrates one-way mirror 212 forming an integrated structure with an actively variable dimmer 216. The actively variable dimmer 216 may have an actively variable light transmission. The actively variable dimmer 216 may include an array of liquid crystal elements 216a disposed between the absorptive polarizer 208 of the one-way mirror 212 and an additional polarizer 216b. The array of liquid crystal elements 216a may be electronically controllable to go from an attenuation mode to a transmission mode, e.g., by application of an electrical input (such as electrical voltage). An example of such an array of liquid crystal elements is disclosed in U.S. Pat. Pub. No. 2018/0234675, which is hereby incorporated by reference in its entirety.

It will be appreciated that actively variable dimmers may include an array of liquid crystal elements sandwiched by two polarizers. Advantageously, the absorptive polarizer 208 may replace one of the polarizers of the actively variable dimmer. Thus, the array of liquid crystal elements 216a may be sandwiched by the absorptive polarizer 208 and the polarizer 216b. The absorptive polarizer 208 is shared by the one-way mirror 212 and the actively variable dimmer 216 to form a single integrated unit, a one-way mirrored dimmer, which may save on component count and decrease the cost and complexity of a device utilizing both a one-way mirror and an actively variable dimmer. In addition, by including the one-way mirror 212 on the outside of the functional element 216 and not between the actively variable dimmer 216 and the display 212, the passive one-way mirror 212, simply comprising additional passive layers of material, may be simply added to a device including the dimmer 216 and the display 210 without significantly reengineering the underlying dimmer and display 210.

It will also be appreciated that, in some implementations, the polarization selective mirror 206 and the absorptive polarizer 208 may contact one another (e.g., be laminated) or they may be spaced apart by a gap (e.g., an air gap). For example, the polarization selective mirror 206 and the absorptive polarizer 218 may be separated by a gap of 1 mm or more, 2 mm or more, or 3 mm or more, including 1-5 mm, 2-5 mm, and 3-5 mm. Such a gap may be present, for example, in the implementations in which the polarization selective mirror 206 is combined with an existing absorptive polarizer 218 and display 210. For example, the polarization selective mirror 206 may be attached to a forward part of a frame holding the absorptive polarizer 218 and display 212 (or the polarization selective mirror 206 may be attached to the frame, and the absorptive polarizer in display 212 may subsequently be added to a rearward part of the frame). As discussed herein, the polarization selective mirror 206 and absorptive polarizer 218 are preferably oriented with aligned transmission axes. However, mechanical attachment of the polarization selective mirror 206 and the absorptive polarizer 218 to a common frame may result in alignment errors, e.g., during assembly of the display system and/or during use of the display system. For example, over time, there may be deformation of the frame, the display system may be subjected to mechanical stresses (e.g., due to being dropped, handled roughly, etc.), and/or one or both of the polarization selective mirror 206 and the absorptive polarizer 218 may become loose. Undesirably, misalignments between the polarization selective mirror 206 and the absorptive polarizer 218 may negatively impact the functionality of the one-way mirror 212, since, as discussed herein, the optical functionality of the one-way mirror depends upon proper alignment of the transmission axes of the various polarization sensitive structures forming the one-way mirror, including the polarization selective mirror 206 and the absorptive polarizer 218.

In some implementations, alignment tolerances between the polarization selective mirror 206 and the absorptive polarizer 218 may be increased using optical structures that convert light into circularly polarized light in the volume (e.g., the gap) between the polarization selective mirror 206 and the absorptive polarizer 218.

FIG. 3C is an example of a schematic side view of an optical device having a one-way mirror 212a with optical retarders 218a, 218b for providing circularly polarized light. As indicated by the like reference numerals, the one-way mirror 212a has features similar to that of the one-way mirror 212 of FIGS. 2A, 2B, 3A, and 3B and details regarding these features will not be repeated here. The one-way mirror 212a further includes one or more retarders 218a, 281b between the polarization selective mirror 206 and the absorptive polarizer 208. Preferably, the one-way mirror 212a includes a pair of opposing retarders 218a, 281b, which directly face one another. The retarders 218a, 281b may be quarter waveplates such as achromatic quarter waveplates.

As illustrated in FIG. 3C, after linearly polarized world light 202a that aligns with the transmission axis of the polarization selective mirror 206 is transmitted through that polarization selective mirror 206, it propagates through a first of the retarders 218a, 281b, where the world light 202a is converted into circularly polarized world light 218c. The circularly polarized world light 218c propagates through a second of the retarders 218, which converts the circularly polarized world light 218c back into linearly polarized light having an orientation which is aligned with the transmission axis of the absorptive polarizer 208, and that linearly polarized light then continues to propagate to the eye 214 as the linearly polarized world light 202c-1.

In some implementations, the retarder 218a is laminated or adhered to the polarization selective mirror 206, such that the retarder 218a and the polarization selective mirror 206 form a contiguous integral unit. In addition or alternatively, in some implementations, the retarder 218b is laminated or adhered to the absorptive polarizer 208, such that the retarder 218b and the absorptive polarizer 208 form a contiguous integral unit. Advantageously, such integral structures may allow precise alignment of the retarder 218a or 218b to the polarization selective mirror 206 or the absorptive polarizer 208 during manufacturing, and may be achieved without requiring the structures to be fitted and aligned, e.g., manually fitted on a frame. In addition, forming such integral units may promote the long-term durability and mechanical stability of the one-way mirror 212a, thereby reducing the occurrence of misalignments over time.

In addition, it will be appreciated that a large source of possible misalignment in the one-way mirrors disclosed herein stems from possible misalignments of the transmission axes of the polarization-selective mirror 206 and the absorptive polarizer 208, particularly when these features are separated by a gap, as discussed herein. Advantageously, by converting world light 202a into circularly polarized light to traverse the gap, the sensitivity of the one-way mirror to misalignments between the polarization-selective mirror 206 and the absorptive polarizer 208 may be reduced, and the alignment tolerances may be increased. In some embodiments, use of circularly polarized light effectively makes the one-way mirror relatively insensitive to misalignment between the polarization-selective mirror 206 and the absorptive polarizer 208; the retarder 218b may be utilized to convert the circularly polarized light to linearly polarized light having the appropriate polarization and orientation to align with the transmission axis of the absorptive polarizer 208, so as to be transmitted through the absorptive polarizer 208.

Figure 3D:
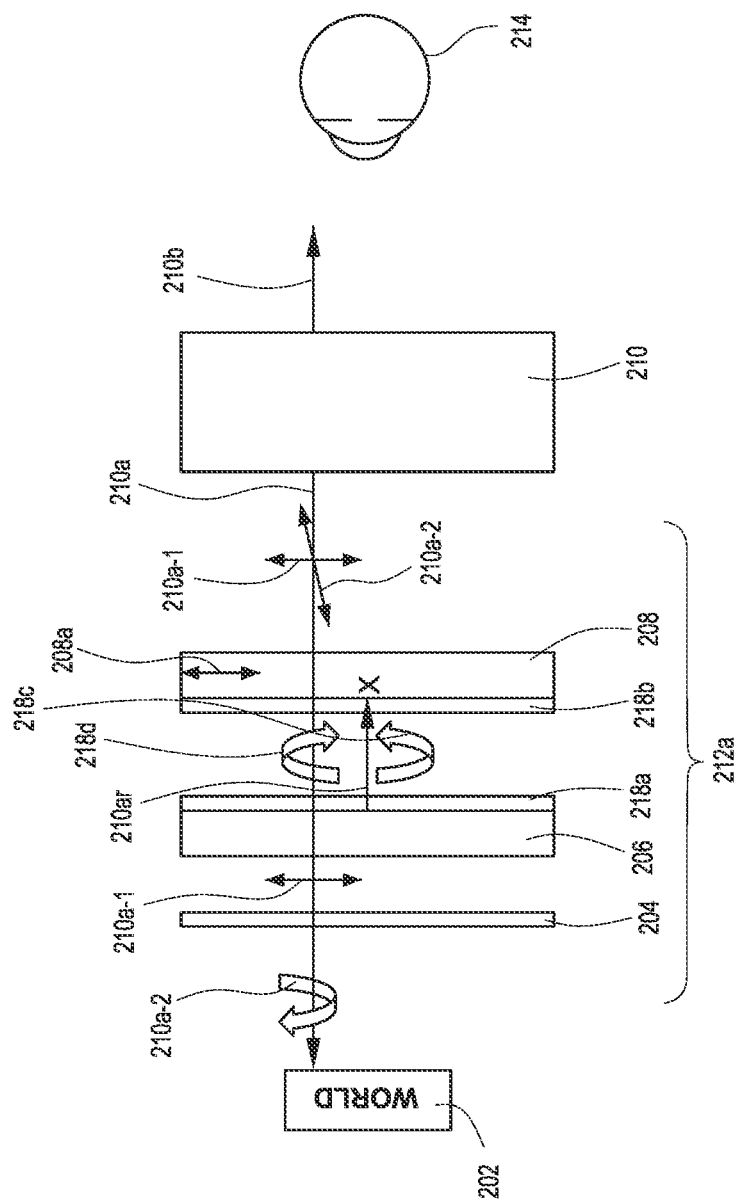

FIG. 3D illustrates the structure of FIG. 3C, now showing an example of the propagation of light from the display 210 through a one-way mirror 212a. The display 210 outputs image light 210b to the user's eyes 214 and also incidentally outputs light 210a forwards, towards the surrounding environment 202. As discussed herein, the polarization of the image light 210a and the electric field vector of that light are oriented such that some of that image light 210a is transmitted through absorptive polarizer 208, while light with an electric field vector not aligned with the transmission axis is absorbed by the absorptive polarizer 208. The retarder 218b then converts the light 210a into circularly polarized light 218d. The retarder 218a subsequently converts the circularly polarized light 218d into linearly polarized light which is oriented to pass through the polarization selective mirror 206 as image light 210a-1.

It will be appreciated that incidental reflections may occur at interfaces between different materials forward of the from retarder 218b, e.g., Fresnel reflections off of the interface between the polarization selective mirror 206 and the retarder 218a. In some embodiments, the incidentally reflected light 210ar passes through the retarder 218a, and is converted into image light of circular polarization 218c. The retarder 218b subsequently converts the light into linearly polarized image light, having a polarization orthogonal to the transmission axis 208a of the absorptive polarizer 208. As a result, the linearly polarized image light is absorbed by the absorptive polarizer 208. Thus, the absorptive polarizer 208 may effectively absorb the reflections 210ar from the polarization selective mirror 206, which may improve image quality.

As discussed herein, in some implementations, the polarization selective mirror may be a reflective circular polarizer, such as a cholesteric liquid crystal reflective polarizer. Examples of cholesteric liquid crystal reflective polarizers are disclosed in U.S. Pat. Pub. No. 2018/0164627, entitled "Diffractive Devices Based on Cholesteric Liquid Crystal", published Jun. 14, 2018, the entire disclosure of which is incorporated by reference herein.

Figure 4A:
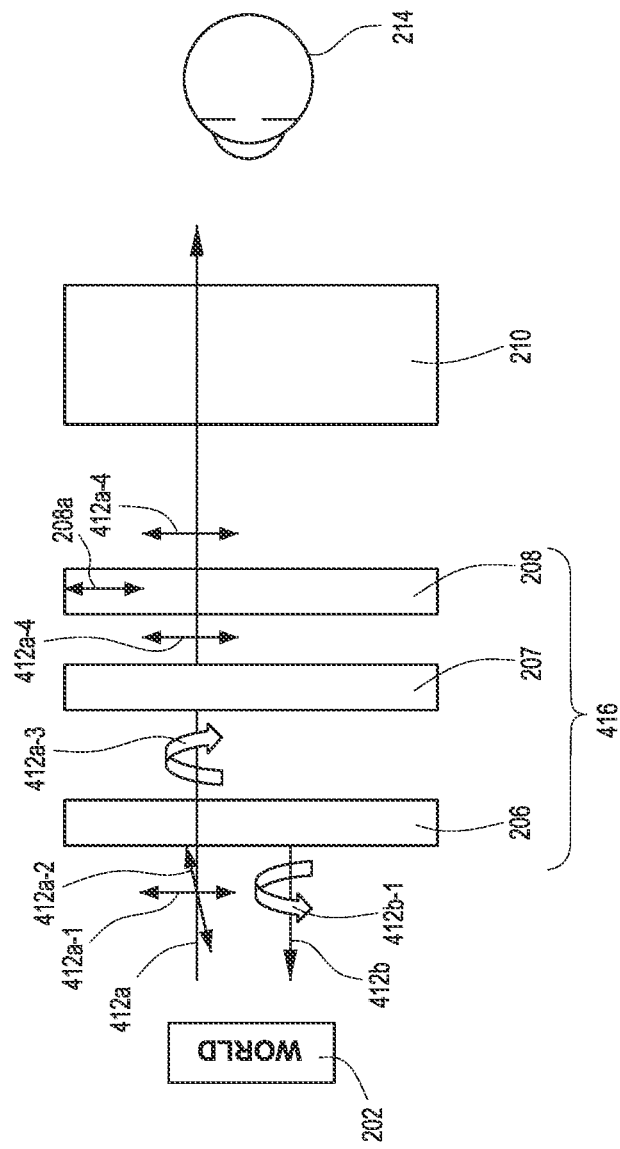
FIGS. 4A and 4B are examples of schematic side views of an optical device having a one-way mirror having a reflective circular polarizer.
Figure 4B:
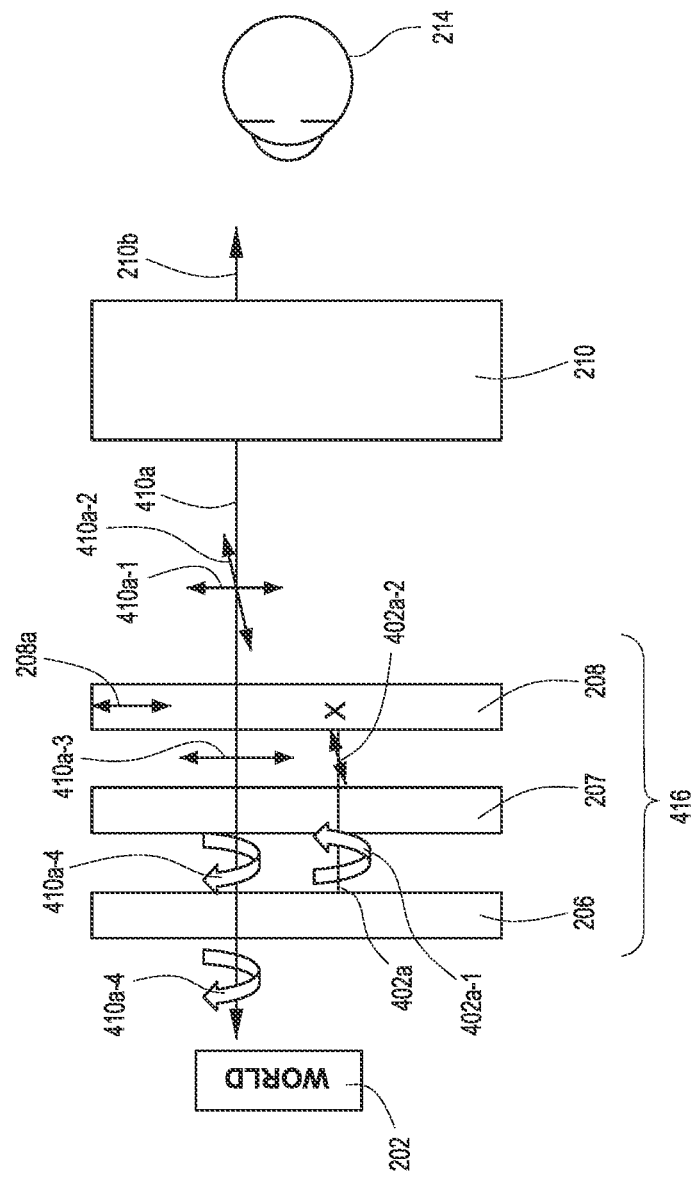

FIGS. 4A and 4B are examples of schematic side views of an optical device having a one-way mirror 416 in which the polarization selective mirror 206 is a reflective circular polarizer. FIG. 4A illustrates the propagation of world light 412a through the optical device and FIG. 4B illustrates the propagation of image light 410a through the optical device. In the illustrated example, the one-way mirror 416 includes the reflective circular polarizer 206 forward of a retarder 204 which is forward of an absorptive polarizer 208.

With reference to FIG. 4A, world light 412a (which may correspond to world light 202a, FIGS. 2A, 3A, 3C) is received from the world 202. The world light 412a includes two orthogonal components 412a-1, 412a-2, which may represent different electric field vectors in some implementations (e.g., for light of different linear polarizations). In the illustrated example, the reflective circular polarizer 206 may be configured to transmit light of one polarization and reflect light 412b having an opposite linear polarization. The transmitted light may be converted to light having circular polarization 412a-3, which then passes through a retarder 207, such as a quarter waveplate, and then an absorptive polarizer 208. The retarder 207 converts the world light having circular polarization 412a-3 into light having a linear polarization 412a-4. Preferably, the orientation of the linear polarization 412a-4 is aligned with the transmission axis 208a of the absorptive polarizer 208. Thus, the world light with linear polarization 412a-4 is transmitted through the absorptive polarizer 208. The world light 412a with linear polarization 412a-4 is subsequently transmitted to the user's eye 214 through a display 210. In some embodiments, the retarder 207 may be laminated or adhered to the absorptive polarizer 208. In addition, in some embodiments, the reflective circular polarizer 206 may be spaced apart from the retarder 207. Advantageously, the circular polarization provided by reflective circular polarizer 206 may increase alignment tolerances, as discussed herein.

FIG. 4B illustrates the propagation of image light from the display 210 in one direction to a user's eye 214 and in an opposite direction through the one-way mirror 416 and out to the world 202. Image light 210b outputted by the display 210 to the eye 214 provides a virtual image to the user's eye 214. As discussed herein, the display 210 may also incidentally output image light 410a toward the world 202. As shown in FIG. 4B, in some implementations, the image light 410a outputted from the display 210 includes two orthogonal electric field vectors 410a-1, 410a-2, representing light of different linear polarizations. The image light 410a coming from the display 210 may be polarized such that image light with electric field vector 410a-2 orthogonal to the transmission axis 208a of the absorptive polarizer 208 is absorbed, while image light with electric field vector 410a-3 aligned with the transmission axis 208a is transmitted. The retarder 207 then converts the transmitted image light into light with a circular polarization 410a-4. The orientation of the transmission axis of the polarization selective mirror 206 matches the orientation 410a-4 of image light propagating forward from the retarder 207 and is transmitted through the polarization selective mirror 206.

As discussed herein, the polarization selective mirror 206 may be a cholesteric liquid crystal polarizer (CLCP), which may provide one or more advantages. The cholesteric liquid crystal polarizer 206 may be substantially insensitive to the angular orientation of incident circularly polarized light and therefore may not need to be oriented with a specific transmission axis alignment relative to the absorptive circular polarizer 408. Further, similar to the one-way mirror 212 with depolarizer 204 of FIG. 3A, the one-way mirror 416 provides reflected light 412b with a circular polarization 412b-1 (FIG. 4A) and transmits light with an opposite circular polarization 410a-4 (FIG. 4B). As discussed above in connection with FIG. 3A, by providing reflected light 412b with a circular polarization, others individuals wearing linear polarizers, such as some sunglasses, are prevented from filtering out the reflected light 412b and seeing the image light 410a escaping into the world 202.

In addition, advantageously, the tint color of the one-way mirror 416 may be adjusted by adjusting the composition of the cholesteric liquid crystal within the CLCP. By adjusting the composition, the CLCP may be configured to reflect predetermined wavelengths of light, thereby impacting the external appearance of the display system utilizing the one-way mirror 416. In addition, while the CLCP may transmit less of some wavelengths of light, the color point of world light reaching the eye 214 would not be affected as the user's view of the world is determined by the absorptive polarizer 208, which may be configured to alter the color point by preferentially transmitting some wavelengths of light. Further, the reflectivity of the CLCP may be adjusted based on the thickness of the CLCP. In some implementations, the CLCP may reflect up to 50% of the world light 412a, e.g., 30-50% or 40-50% of the world light 412a. In some implementations, the CLCP may reflect 20-70%, 30-70% 30-60%, or 40-60% of the incident world light 412a. By tailoring the amount of light reflected, the CLCP may tailor the level of privacy.

With reference again to FIG. 4B, it will be appreciated that Fresnel reflections may occur for image light 410a incident on the surface of the cholesteric liquid crystal polarizer 206 after passing through retarder 207. A portion of the image light 410a may reflect off of the cholesteric liquid crystal polarizer 206 as reflected image light 402a having a circular polarization 402a-1, which is opposite to the polarization 410a-4 of image light 410a incident on the cholesteric liquid crystal polarizer 206. The circularly polarized reflected image light 402a may be converted into linearly polarized light having a linear polarization 402a-2 by the retarder 207. The linear polarization 402a-2 may be orthogonal to the transmission axis 208a of the absorptive polarizer 208 and may be absorbed by the absorptive polarizer 208. Advantageously, unlike the implementation of FIG. 3C, the one-way mirror 416 of FIGS. 4A and 4B may omit the use of additional quarter waveplates, while still providing large alignment tolerances and low levels of reflected image light 402a to the user's eye 214. In addition, in some implementations, a depolarizer, such as the depolarizer 204 (FIGS. 2A-3d), may be provided forward of the cholesteric liquid crystal polarizer 206, to allow transmission of polarized light through the cholesteric liquid crystal polarizer 206, irrespective of the orientation of that polarized light relative to the cholesteric liquid crystal polarizer 206.

FIG. 4C illustrates is a side view of an implementation of the one-way mirror 416 of FIGS. 4A and 4B having an actively variable dimmer 216. The actively variable dimmer 216 includes an array of liquid crystal elements 216a which is sandwiched between the absorptive polarizer 208 and the polarizer 216b. Thus, the absorptive polarizer 208 advantageously provides optical functionality for both the one-way mirror 416 and the actively variable dimmer 216, thereby providing a highly compact structure with multiple optical functionalities, as further discussed herein regarding FIG. 2C.

As also discussed herein, the displays and one-way mirrors of FIG. 2A-4c may be part of an augmented reality display system. Details of some implementations of augmented reality display systems are described below.

Example Augmented Reality Display Systems

Figure 5:
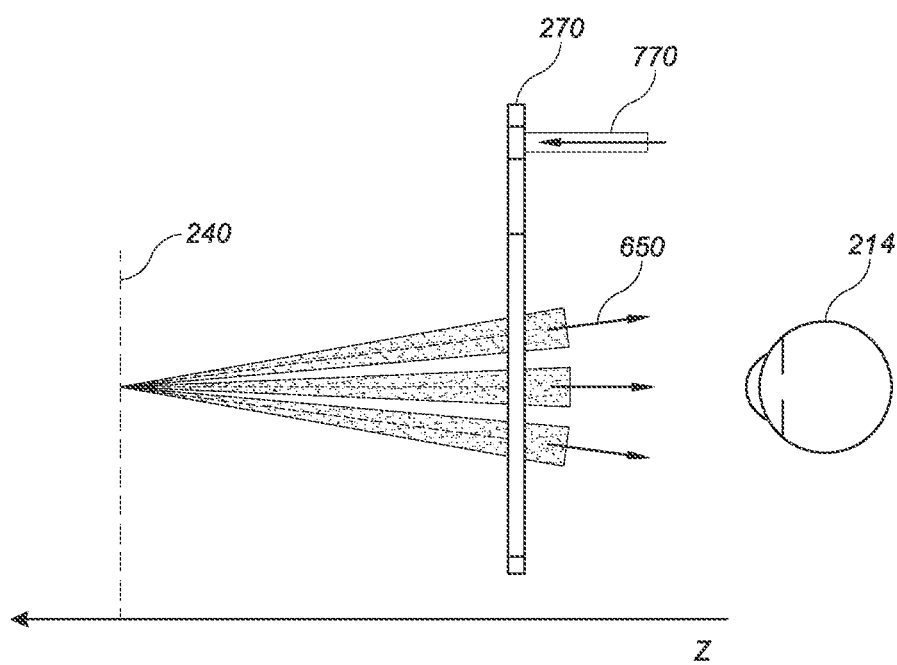
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 214. The waveguide 270 may also be referred to as an eyepiece, which relays image light 772 to the user's eyes 214. The waveguide 270 may output the light 650 with a defined amount of wavefront divergence corresponding to the wavefront divergence of a light field produced by a point on a desired depth plane 240. In some implementations, the same amount of wavefront divergence is provided for all objects presented on that depth plane. In addition, it will be illustrated that the other eye of the user may be provided with image information from a similar waveguide.

In some implementations, a single waveguide may be configured to output light with a set amount of wavefront divergence corresponding to a single or limited number of depth planes and/or the waveguide may be configured to output light of a limited range of wavelengths. Consequently, in some implementations, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
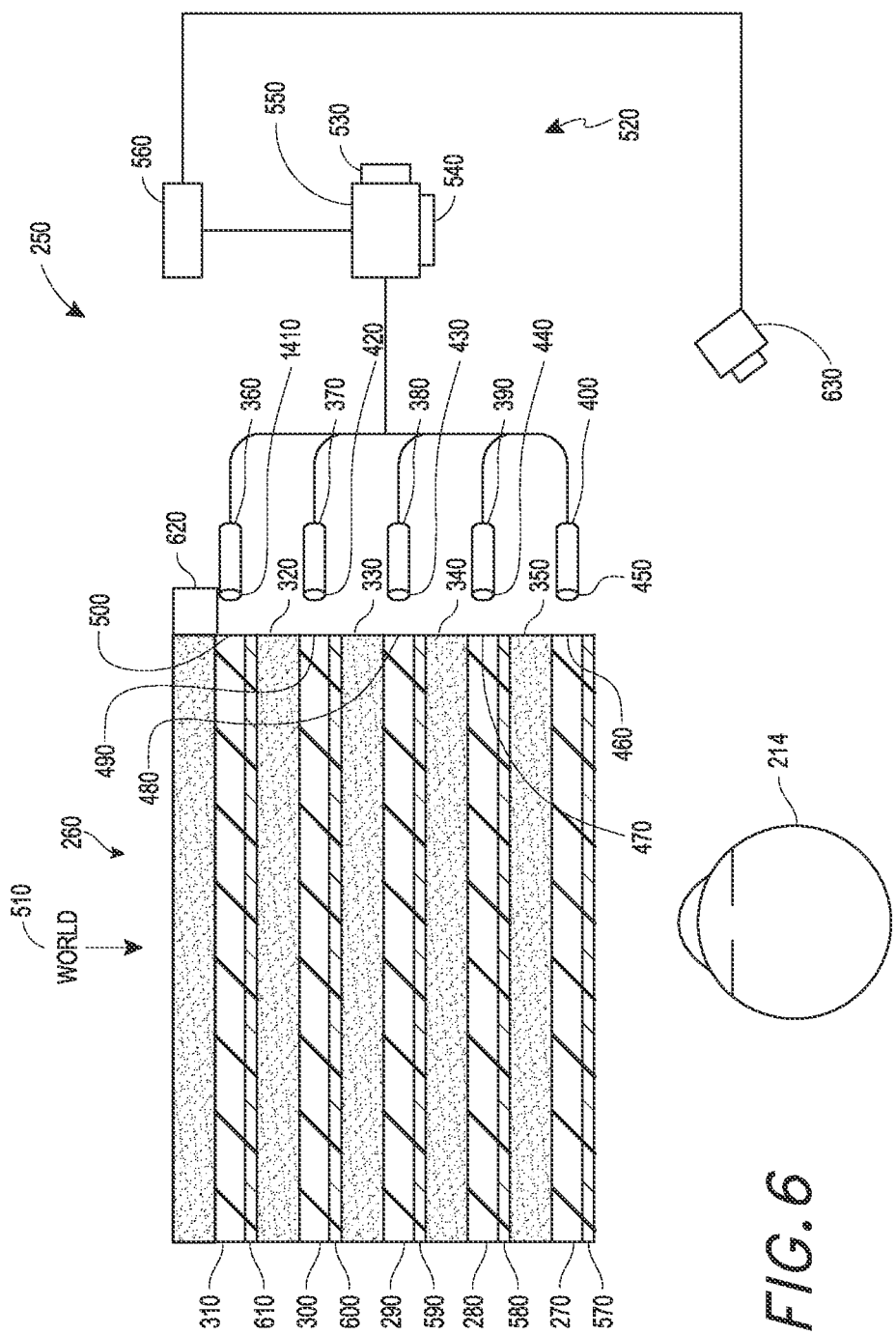
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some implementations. In addition, the waveguide assembly 260 may also be referred to as an eyepiece.

In some implementations, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some implementations, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some implementations, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 214. Light exits an output surface 1410, 420, 430, 440, 450 of the image injection devices 360, 370, 380, 390, 400 and is injected into a corresponding input surface 460, 470, 480, 490, 500 of the waveguides 270, 280, 290, 300, 310. In some implementations, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 214). In some implementations, a single beam of light (e.g. a collimated beam) may be injected into each waveguide to output an entire field of cloned collimated beams that are directed toward the eye 214 at particular angles (and amounts of divergence) corresponding to the depth plane associated with a particular waveguide. In some implementations, a single one of the image injection devices 360, 370, 380, 390, 400 may be associated with and inject light into a plurality (e.g., three) of the waveguides 270, 280, 290, 300, 310.

In some implementations, the image injection devices 360, 370, 380, 390, 400 are discrete display structures that each produce image information for injection into a corresponding waveguide 270, 280, 290, 300, 310, respectively. In some other implementations, the image injection devices 360, 370, 380, 390, 400 are the output ends of a single multiplexed system for outputting image light which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some implementations, the light injected into the waveguides 270, 280, 290, 300, 310 is provided by a light projection system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. In some other implementations, the spatial light modulator may be a MEMS device, such as a digital light processing (DLP) device. It will be appreciated that the image injection devices 360, 370, 380, 390, 400 are illustrated schematically and, in some implementations, these image injection devices may represent different light paths and locations in a common projection system configured to output light into associated ones of the waveguides 270, 280, 290, 300, 310. In some implementations, the waveguides of the waveguide assembly 260 may function as ideal lens while relaying light injected into the waveguides out to the user's eyes. In this conception, the object may be the spatial light modulator 540 and the image may be the image on the depth plane.

In some implementations, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 214 of the viewer. In some implementations, the illustrated image injection devices 360, 370, 380, 390, 400 may schematically represent a single scanning fiber or a bundle of scanning fibers configured to inject light into one or a plurality of the waveguides 270, 280, 290, 300, 310. In some other implementations, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some implementations, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some implementations, the controller may be a single integral device, or a distributed system connected by wired or wireless communication channels. The controller 560 may be part of the processing modules 140 or 150 (FIG. 9E) in some implementations.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 214. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some implementations, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some implementations, the out-coupling optical elements 570, 580, 590, 600, 610 may be formed in a layer of material that is attached to a transparent substrate to form the waveguides 270, 280, 290, 300, 310. In some other implementations, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 214. The collimated light may be representative of the optical infinity focal plane. The next waveguide up 280 may be configured to send out collimated light which passes through the first lens 350 (e.g., a negative lens) before it may reach the eye 214; such first lens 350 may be configured to create a slight convex wavefront curvature so that the eye/brain interprets light coming from that next waveguide up 280 as coming from a first focal plane closer inward toward the eye 214 from optical infinity. Similarly, the third up waveguide 290 passes its output light through both the first 350 and second 340 lenses before reaching the eye 214; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative implementations, either or both may be dynamic using electro-active features.

In some implementations, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some implementations, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some implementations, the features 320, 330, 340, 350 may not be lenses; rather, they may simply be spacers (e.g., cladding layers and/or structures for forming air gaps).

In some implementations, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 214 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 214 for this particular collimated beam bouncing around within a waveguide.

In some implementations, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some implementations, a camera assembly 630 (e.g., a digital camera, including visible light and infrared light cameras) may be provided to capture images of the eye 214 and/or tissue around the eye 214 to, e.g., detect user inputs and/or to monitor the physiological state of the user. As used herein, a camera may be any image capture device. In some implementations, the camera assembly 630 may include an image capture device and a light source to project light (e.g., infrared light) to the eye, which may then be reflected by the eye and detected by the image capture device. In some implementations, the camera assembly 630 may be attached to the frame or support structure 80 (FIG. 9E) and may be in electrical communication with the processing modules 140 and/or 150, which may process image information from the camera assembly 630. In some implementations, one camera assembly 630 may be utilized for each eye, to separately monitor each eye.

The camera assembly 630 may, in some implementations, observe movements of the user, such as the user's eye movements. As an example, the camera assembly 630 may capture images of the eye 214 to determine the size, position, and/or orientation of the pupil of the eye 214 (or some other structure of the eye 214). The camera assembly 630 may, if desired, obtain images (processed by processing circuitry of the type described herein) used to determine the direction the user is looking (e.g., eye pose or gaze direction). In some implementations, camera assembly 630 may include multiple cameras, at least one of which may be utilized for each eye, to separately determine the eye pose or gaze direction of each eye independently. The camera assembly 630 may, in some implementations and in combination with processing circuitry such as the controller 560 or the local data processing module 140, determine eye pose or gaze direction based on glints (e.g., reflections) of reflected light (e.g., infrared light) from a light source included in camera assembly 630.

Figure 7:
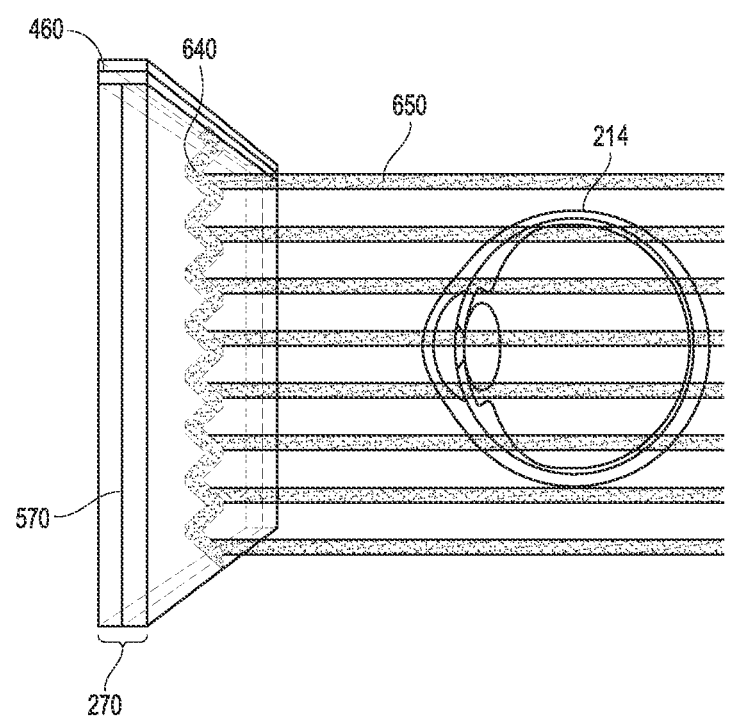
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 214 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 214. Other waveguides or other sets of out-coupling optical elements may output an exit beam pattern that is more divergent, which would require the eye 214 to accommodate to a closer distance to bring it into focus on the retina and would be interpreted by the brain as light from a distance closer to the eye 214 than optical infinity.

Figure 8:
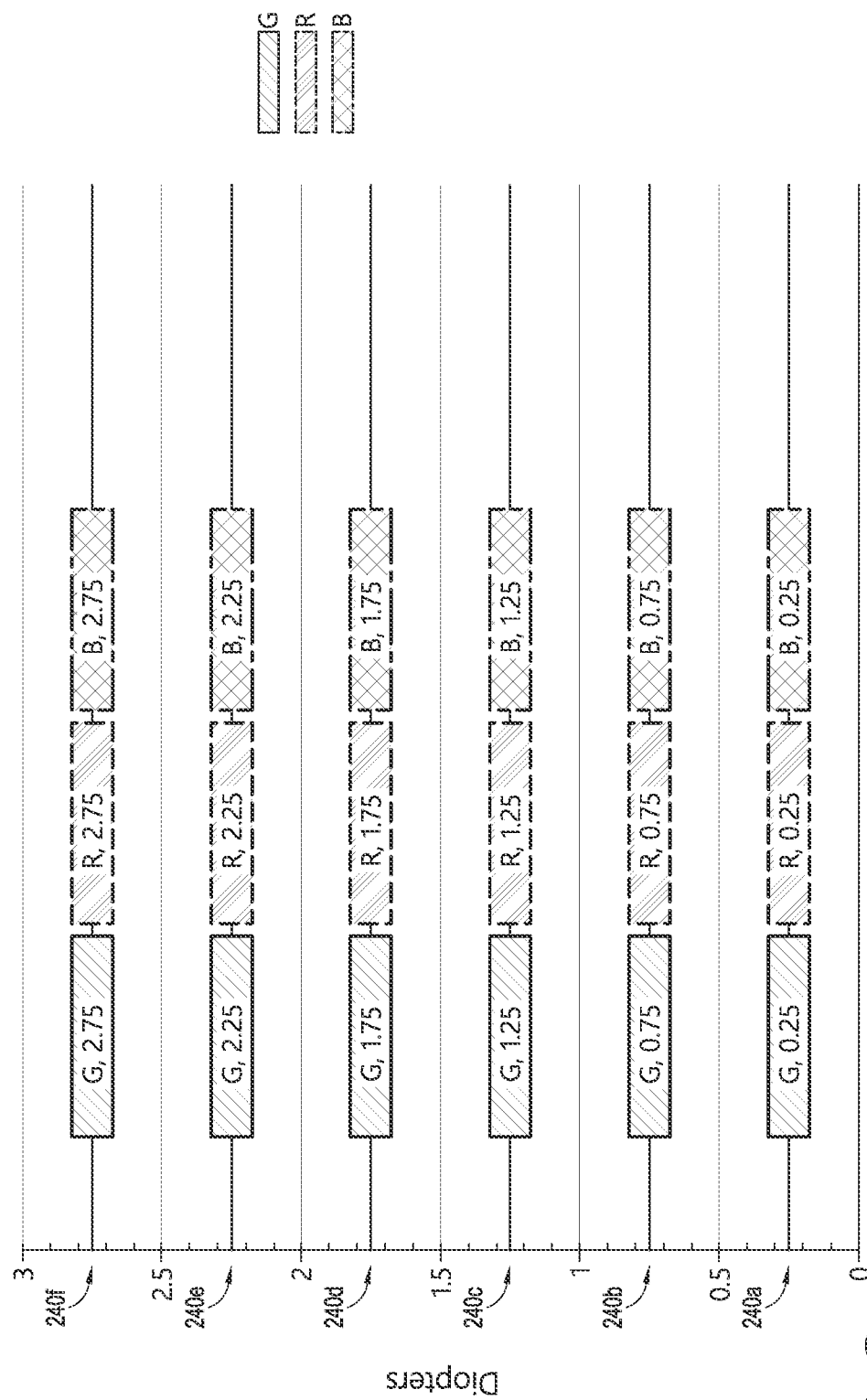
FIG. 8 illustrates an example of a stacked eyepiece in which each depth plane includes images formed using multiple different component colors.

In some implementations, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated implementation shows depth planes 240*a*-240*f*, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some implementations, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some implementations, light of each component color may be outputted by a single dedicated waveguide and, consequently, each depth plane may have multiple waveguides associated with it. In such implementations, each box in the figures including the letters G, R, or B may be understood to represent an individual waveguide, and three waveguides may be provided per depth plane where three component color images are provided per depth plane.

While the waveguides associated with each depth plane are shown adjacent to one another in this drawing for ease of description, it will be appreciated that, in a physical device, the waveguides may all be arranged in a stack with one waveguide per level. In some other implementations, multiple component colors may be outputted by the same waveguide, such that, e.g., only a single waveguide may be provided per depth plane.

With continued reference to FIG. 8, in some implementations, G is the color green, R is the color red, and B is the color blue. In some other implementations, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some implementations, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display system 250 may be configured to direct and emit this light out of the waveguides towards the user's eye 214, e.g., for imaging and/or user stimulation applications.

Figure 9A:
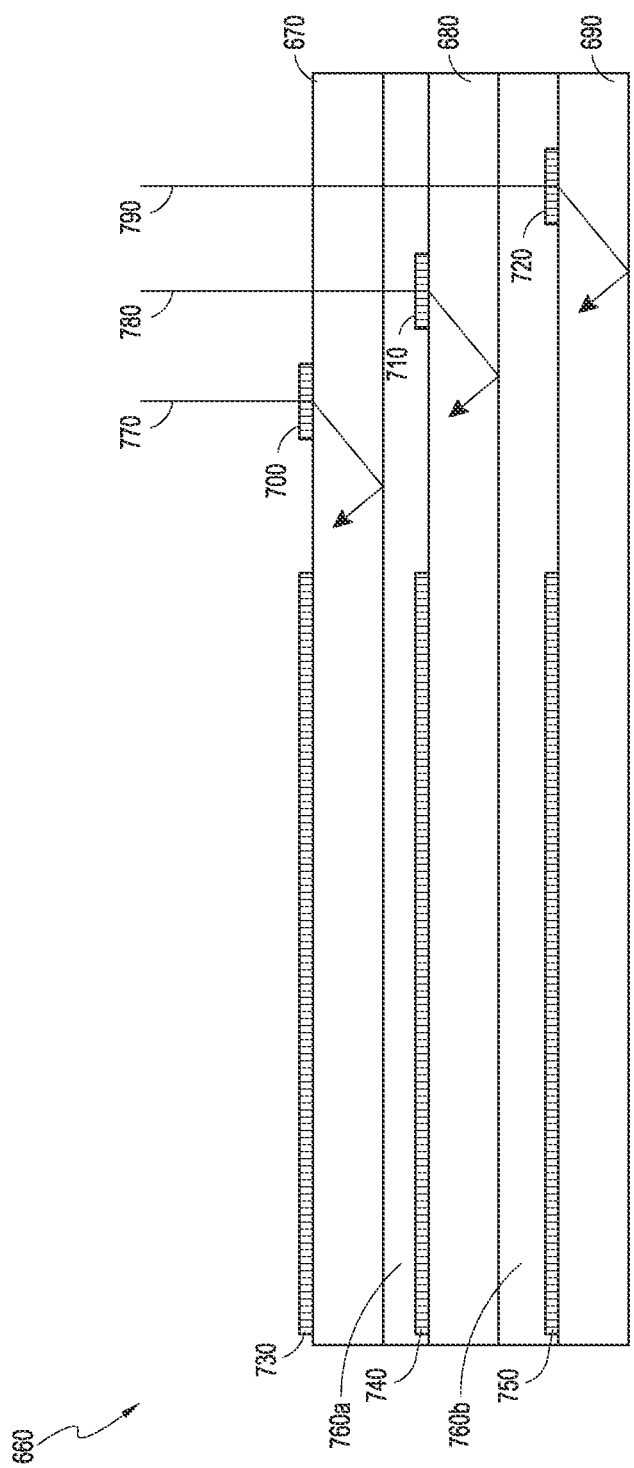
FIG. 9A illustrates a cross-sectional side view of an example of a set of stacked waveguides that each includes an in-coupling optical element.

With reference now to FIG. 9A, in some implementations, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some implementations, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690

(or the top of the next lower waveguide), particularly where those in-coupling optical elements are transmissive, deflecting optical elements. In some implementations, the in-coupling optical elements 700, 710, 720 may be disposed in the body of the respective waveguide 670, 680, 690. In some implementations, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some implementations.

As illustrated, the in-coupling optical elements 700, 710, 720 may be laterally offset from one another, as seen in the illustrated head-on view in a direction of light propagating to these in-coupling optical elements. In some implementations, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other implementations, the light distributing elements 730, 740, 750, may be disposed on a bottom major surface of associated waveguides 670, 680, 690, respectively. In some other implementations, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some implementations, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some implementations, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some implementations, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some implementations, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some implementations, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
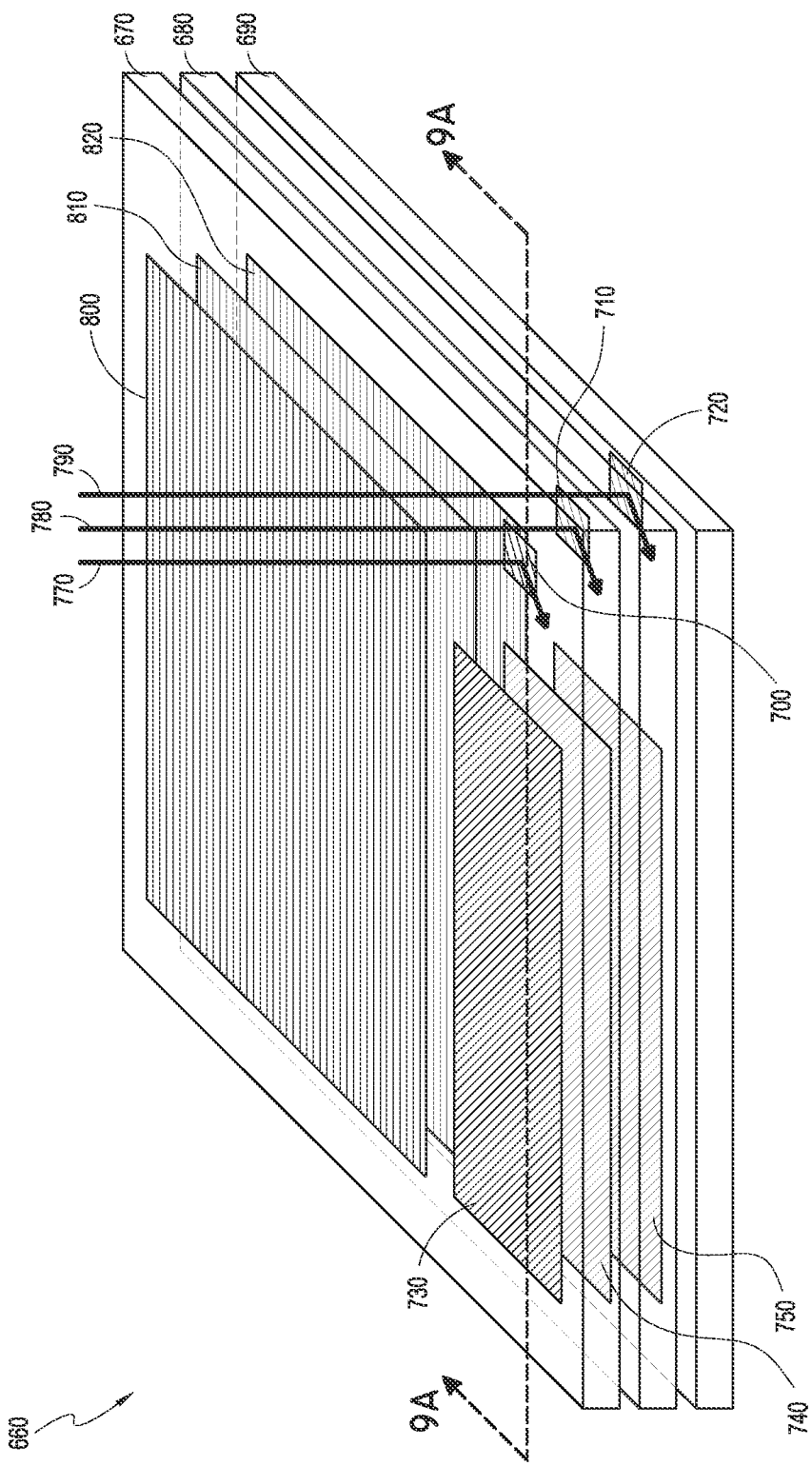
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some implementations, the light distributing elements 730, 740, 750 are orthogonal pupil expanders (OPE's). In some implementations, the OPE's deflect or distribute light to the out-coupling optical elements 800, 810, 820 and, in some implementations, may also increase the beam or spot size of this light as it propagates to the out-coupling optical elements. In some implementations, the light distributing elements 730, 740, 750 may be omitted and the in-coupling optical elements 700, 710, 720 may be configured to deflect light directly to the out-coupling optical elements 800, 810,

820. For example, with reference to FIG. 9A, the light distributing elements 730, 740, 750 may be replaced with out-coupling optical elements 800, 810, 820, respectively. In some implementations, the out-coupling optical elements 800, 810, 820 are exit pupils (EP's) or exit pupil expanders (EPE's) that direct light in a viewer's eye 214 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some implementations, the OPE and/or EPE may be configured to modify a size of the beams of light.

Accordingly, with reference to FIGS. 9A and 9B, in some implementations, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
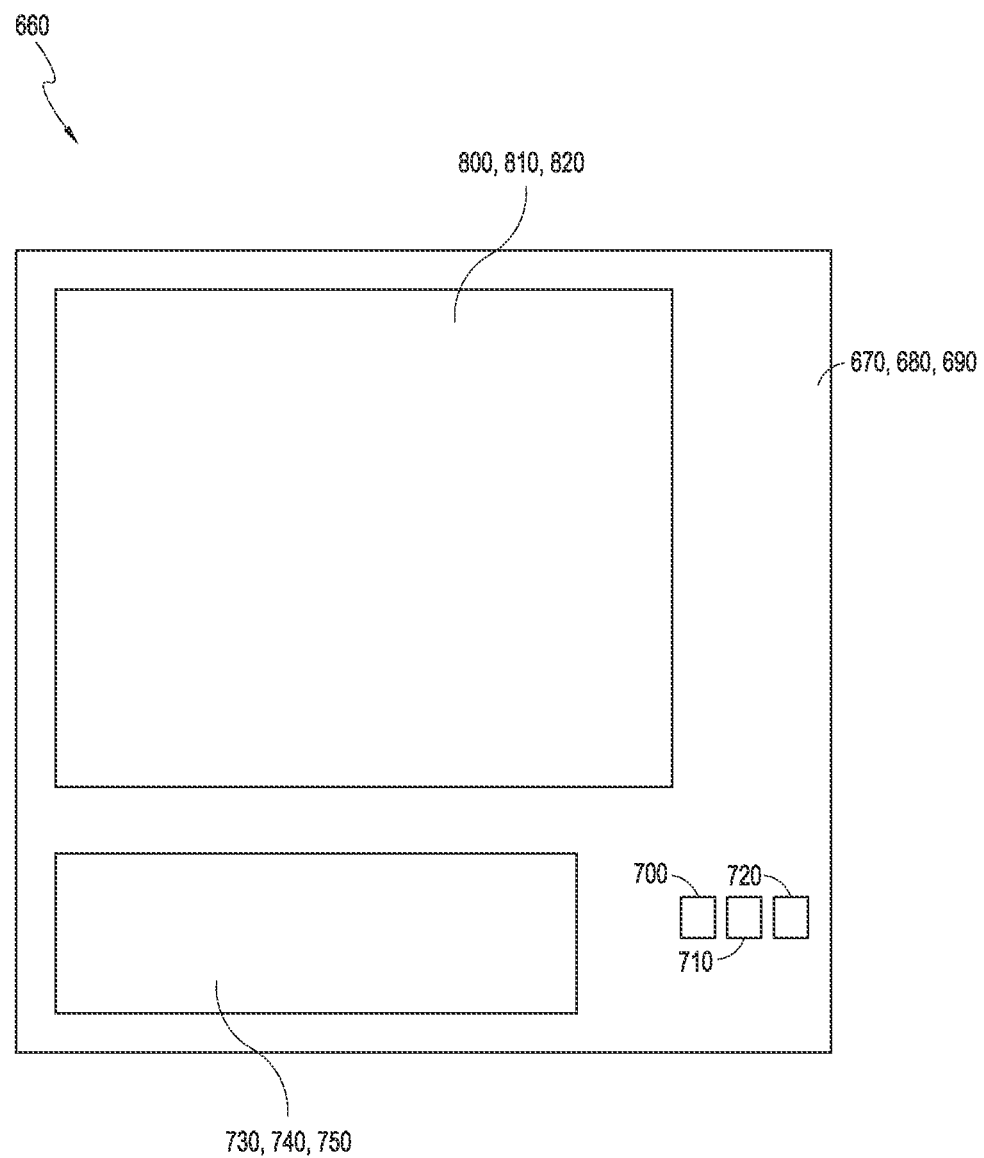
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. It will be appreciated that this top-down view may also be referred to as a head-on view, as seen in the direction of propagation of light towards the in-coupling optical elements 800, 810, 820; that is, the top-down view is a view of the waveguides with image light incident normal to the page. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different sources into different waveguides on a one-to-one basis, thereby allowing a specific light source to be uniquely coupled to a specific waveguide. In some implementations, arrangements including nonoverlapping spatially-separated in-coupling optical elements may be referred to as a shifted pupil system, and the in-coupling optical elements within these arrangements may correspond to sub-pupils.

It will be appreciated that the spatially overlapping areas may have lateral overlap of 70% or more, 80% or more, or 90% or more of their areas, as seen in the top-down view. On the other hand, the laterally shifted areas of less than 30% overlap, less than 20% overlap, or less than 10% overlap of their areas, as seen in top-down view. In some implementations, laterally shifted areas have no overlap.

Figure 9D:
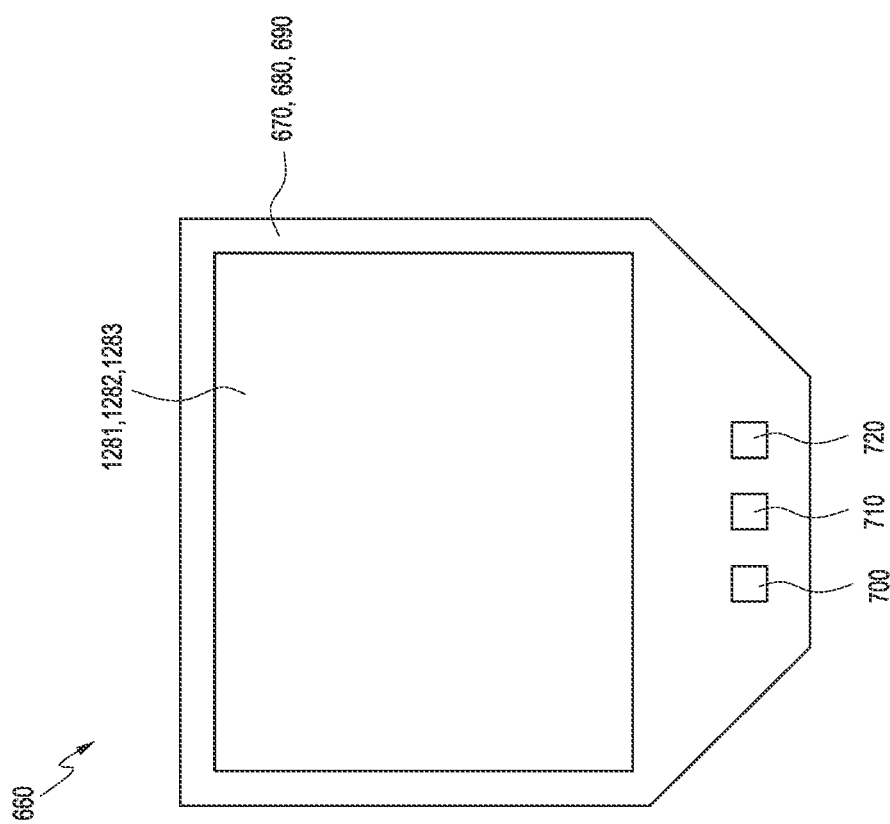
FIG. 9D illustrates a top-down plan view of another example of a plurality of stacked waveguides.

FIG. 9D illustrates a top-down plan view of another example of a plurality of stacked waveguides. As illustrated, the waveguides 670, 680, 690 may be vertically aligned. However, in comparison to the configuration of FIG. 9C, separate light distributing elements 730, 740, 750 and associated out-coupling optical elements 800, 810, 820 are omitted. Instead, light distributing elements and out-coupling optical elements are effectively superimposed and occupy the same area as seen in the top-down view. In some implementations, light distributing elements (e.g., OPE's) may be disposed on one major surface of the waveguides 670, 680, 690 and out-coupling optical elements (e.g., EPE's) may be disposed on the other major surface of those waveguides. Thus, each waveguide 670, 680, 690 may have superimposed light distributing and out coupling optical elements, collectively referred to as combined OPE/EPE's 1281, 1282, 1283, respectively. Further details regarding such combined OPE/EPE's may be found in U.S. Pat. Pub. No. 2019/0187474A1, entitled "Eyepieces for Augmented Reality Display System", published Jun. 20, 2019, the entire disclosure of which is incorporated by reference herein. The in-coupling optical elements 700, 710, 720 in-couple and direct light to the combined OPE/EPE's 1281, 1282, 1283, respectively. In some implementations, as illustrated, the in-coupling optical elements 700, 710, 720 may be laterally shifted (e.g., they are laterally spaced apart as seen in the illustrated top-down view) in have a shifted pupil spatial arrangement. As with the configuration of FIG. 9C, this laterally-shifted spatial arrangement facilitates the injection of light of different wavelengths (e.g., from different light sources) into different waveguides on a one-to-one basis.

Figure 9E:
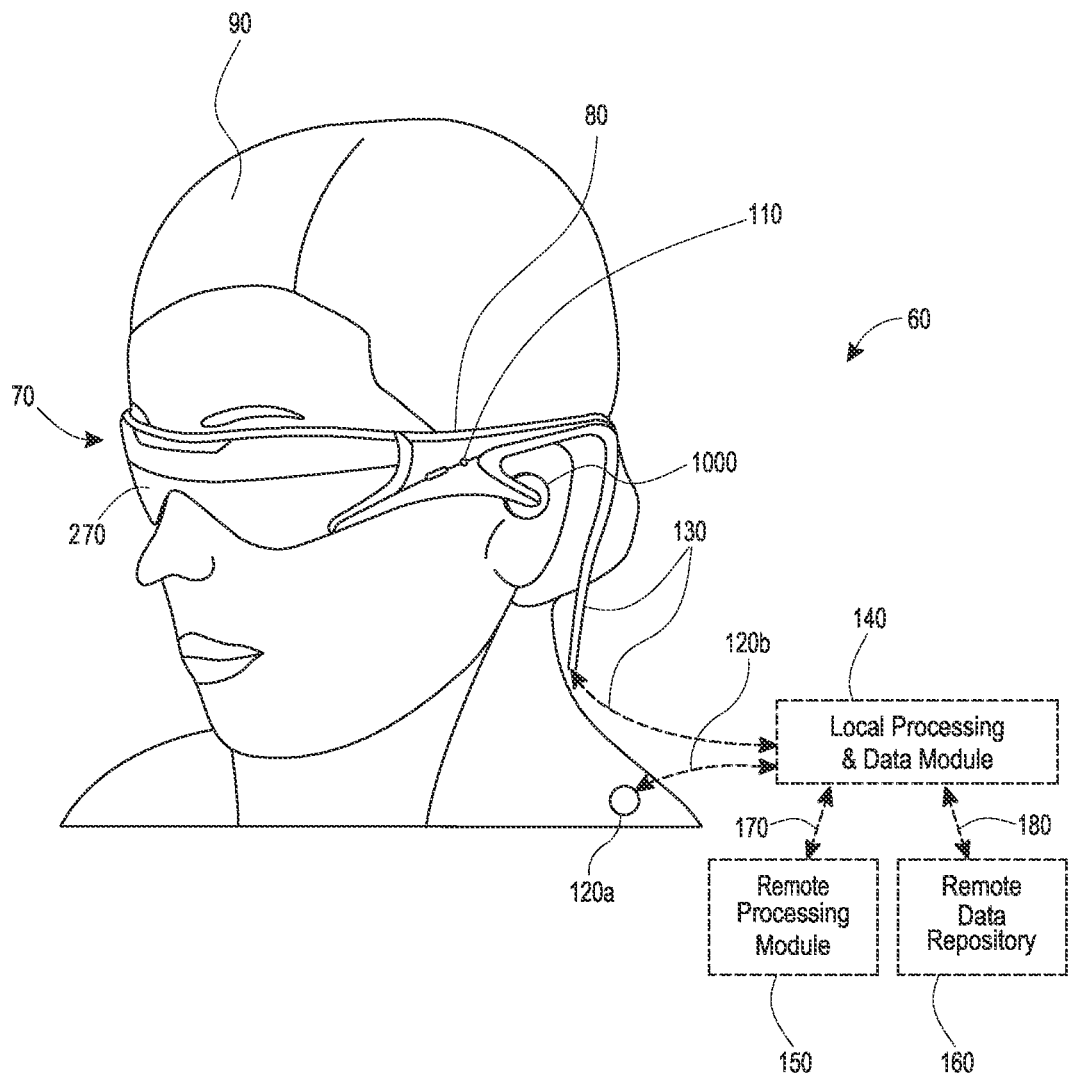
FIG. 9E illustrates an example of wearable display system.

FIG. 9E illustrates an example of wearable display system 60 into which the various waveguides and related systems disclosed herein may be integrated. In some implementations, the display system 60 is the display system 250 of FIG. 6, with FIG. 6 schematically showing some parts of that system 60 in greater detail. For example, the waveguide assembly 260 of FIG. 6 may be part of a display assembly 70, which may correspond to the display assembly 102 (FIG. 1B).

With continued reference to FIG. 9E, the display system 60 includes the display assembly 70, and various mechanical and electronic modules and systems to support the functioning of that display assembly 70. The display assembly 70 may be coupled to a frame 80, which is wearable by a display system user or viewer 90 and which is configured to position the display assembly 70 in front of the eyes of the user 90. The display assembly 70 may be considered eyewear in some implementations. The display assembly 70 may include one or more waveguides, such as the waveguide 270, configured to relay in-coupled image light and to output that image light to an eye of the user 90. In some implementations, a speaker 1000 is coupled to the frame 80 and configured to be positioned adjacent the ear canal of the user 90 (in some implementations, another speaker, not shown, may optionally be positioned adjacent the other ear canal of the user to provide stereo/shapeable sound control). The display system 60 may also include one or more microphones 110 or other devices to detect sound. In some implementations, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some implementations, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some implementations, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some implementations. For example, the sensor 120a may be an electrode.

With continued reference to FIG. 9E, the display assembly 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display assembly 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some implementations, the local processing and data module 140 may include one or more of the image capture devices, microphones, inertial measurement units, accelerometers, compasses, GPS units, radio devices, and/or gyros. In some other implementations, one or more of these sensors may be attached to the frame 80, or may be standalone structures that communicate with the local processing and data module 140 by wired or wireless communication pathways.

With continued reference to FIG. 9E, in some implementations, the remote processing module 150 may comprise one or more processors configured to analyze and process data and/or image information, for instance including one or more central processing units (CPUs), graphics processing units (GPUS), dedicated processing hardware, and so on. In some implementations, the remote data repository 160 may comprise a digital data storage facility, which may be available through the internet or other networking configuration in a "cloud" resource configuration. In some implementations, the remote data repository 160 may include one or more remote servers, which provide information, e.g., information for generating virtual content, to the local processing and data module 140 and/or the remote processing module 150. In some implementations, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

In the foregoing discussion, the invention has been described with reference to specific implementations thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every implementation.

It will be appreciated that conditional language used herein, such as, among others, "can," "could," "might," "may," "e.g.," and the like, unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without author input or prompting, whether these features, elements and/or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other implementations. Moreover, the separation of various system components in the implementations described above should not be understood as requiring such separation in all implementations. Additionally, other implementations are within the scope of the following claims. In some cases, the actions recited in the claims may be performed in a different order and still achieve desirable results.

Accordingly, the claims are not intended to be limited to the implementations shown herein, but are to be accorded the widest scope consistent with this disclosure, the principles and the novel features disclosed herein.

What is claimed is:

1. An optical device that is wearable on a head of a user, the optical device comprising:
    a one-way mirror arranged on a world side of the optical device, the one-way mirror comprising:
        a depolarizer including at least one retarder having random optical axis orientations such that the depolarizer receives light from the world side of the optical device and randomizes a polarization of at least a portion of the received light;
        a polarization selective mirror oriented to receive light from the depolarizer and configured to transmit, through the polarization selective mirror, a portion of the received light having randomized polarization, the polarization selective mirror having a transmission axis; and
        an absorptive polarizer oriented to receive the light transmitted through the polarization selective mirror, the absorptive polarizer having a transmission axis aligned with the transmission axis of the polarization selective mirror,
        wherein the polarization selective mirror is disposed between the depolarizer and the absorptive polarizer.

2. The optical device of claim 1, wherein the depolarizer comprises a quarter waveplate.

3. The optical device of claim 1, wherein the depolarizer comprises a super retarder.

4. The optical device of claim 1, wherein the polarization selective mirror and the absorptive polarizer are spaced apart, and further comprising one or more retarders between the polarization selective mirror and the absorptive polarizer.

5. The optical device of claim 4, wherein the one or more retarders comprise two spaced-apart quarter wave plates.

6. The optical device of claim 1, wherein the polarization selective mirror comprises a reflective polarizer.

7. The optical device of claim 6, wherein the reflective polarizer comprises a wire-grid polarizer.

8. The optical device of claim 7, wherein the wire-grid polarizer comprises a nano-scale wire pattern with repeating parallel wires.

9. The optical device of claim 8, wherein the wires of the wire pattern are each elongated parallel to the transmission axis of the polarization selective mirror.

10. The optical device of claim 6, wherein the reflective polarizer comprises a multi-layer polarizer.

11. The optical device of claim 10, wherein the multi-layer polarizer is configured to reflect incident light of a pre-determined wavelength.

12. The optical device of claim 10, wherein the multi-layer polarizer comprises a plurality of polymer films.

13. The optical device of claim 10, wherein the multi-layer polarizer reflects 50% or less of incident light with an electric field vector perpendicular to the transmission axis of the multi-layer polarizer.

14. The optical device of claim 10, wherein the multi-layer polarizer reflects 30% to 40% of incident light with an electric field vector perpendicular to the transmission axis of the multi-layer polarizer.

15. The optical device of claim 1, wherein the absorptive polarizer is configured to absorb linearly polarized light.

16. The optical device of claim 1, wherein the optical device is a head-mounted display system, wherein the display system comprises a head-mounted display, and wherein the one-way mirror is disposed on the world side of the head-mounted display and opposite a user side of the display while the display is being worn by the user.

17. The optical device of claim 16, wherein the display comprises an eyepiece including at least one waveguide that is configured to output, to the user, light conveying virtual content, wherein the at least one waveguide is at least partly transparent to transmit, to at least one eye of the user, at least a portion of the light that is transmitted through the polarization selective mirror, wherein the at least one waveguide includes a plurality of waveguides each configured to output light with a different amount of wavefront divergence than one or more other waveguides of the plurality of waveguides, and wherein different amounts of wavefront divergence correspond to different depth planes.

18. The optical device of claim 1, further comprising an actively variable dimmer comprising the absorptive polarizer, an additional polarizer, and an array of liquid crystal elements disposed between the absorptive polarizer and the additional polarizer, wherein the actively variable dimmer is configured to variably dim at least a portion of the light from the world side that is transmitted through the one-way mirror and to transmit the dimmed light toward an eye of the user.

* * * * *